United States Patent
Nishida et al.

(10) Patent No.: US 8,780,377 B2
(45) Date of Patent: Jul. 15, 2014

(54) PRINT CONTROL DEVICE MANAGING A PRINT JOB BASED ON AN INSTRUCTION FROM A CLIENT TERMINAL

(75) Inventors: Takahiko Nishida, Kawasaki (JP); Koichi Abe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 13/532,520

(22) Filed: Jun. 25, 2012

(65) Prior Publication Data

US 2013/0003106 A1    Jan. 3, 2013

(30) Foreign Application Priority Data

Jun. 29, 2011 (JP) ................................ 2011-143979
Dec. 26, 2011 (JP) ................................ 2011-282782

(51) Int. Cl.
*G06F 15/00* (2006.01)
*G06F 3/12* (2006.01)
*G06K 1/00* (2006.01)
*G06K 15/00* (2006.01)

(52) U.S. Cl.
CPC ............ *G06F 3/1238* (2013.01); *G06F 3/1274* (2013.01); *G06K 15/4095* (2013.01)
USPC .......................................... 358/1.14; 358/1.15

(58) Field of Classification Search
CPC ..... G06F 21/30; G06F 21/608; G06F 3/1222; G06F 3/1238; G06F 3/1274; G06K 15/02; G06K 15/4095
See application file for complete search history.

(56) References Cited

U.S. PATENT DOCUMENTS

| | | | |
|---|---|---|---|
| 6,892,299 B2 | 5/2005 | Abe | |
| 7,019,857 B2 | 3/2006 | Abe | |
| 7,084,999 B2 | 8/2006 | Abe | |
| 8,085,425 B2 | 12/2011 | Abe | |
| 8,395,791 B2 * | 3/2013 | Imamura et al. | 358/1.14 |
| 2007/0005845 A1 | 1/2007 | Abe | |
| 2008/0052778 A1 * | 2/2008 | Narusawa et al. | 726/19 |
| 2012/0005378 A1 | 1/2012 | Abe et al. | |
| 2012/0050798 A1 | 3/2012 | Abe | |

FOREIGN PATENT DOCUMENTS

JP    2000-330953    11/2000

* cited by examiner

*Primary Examiner* — Douglas Tran
(74) *Attorney, Agent, or Firm* — Fitzpatrick, Cella, Harper & Scinto

(57) ABSTRACT

A print control device manages a print job and a printer based on an instruction from a client terminal. The print control device accepts a print instruction to the printer from the client terminal and authentication information about the client terminal, confirms the validity of the authentication information to an authentication unit configured to issue and manage the authentication information, registers the print job as an execution job together with the authentication information if the authentication information is valid, and accesses the authentication unit during registration of the execution job to thereby update the expiration date/time of the registered authentication information.

16 Claims, 24 Drawing Sheets

FIG. 2
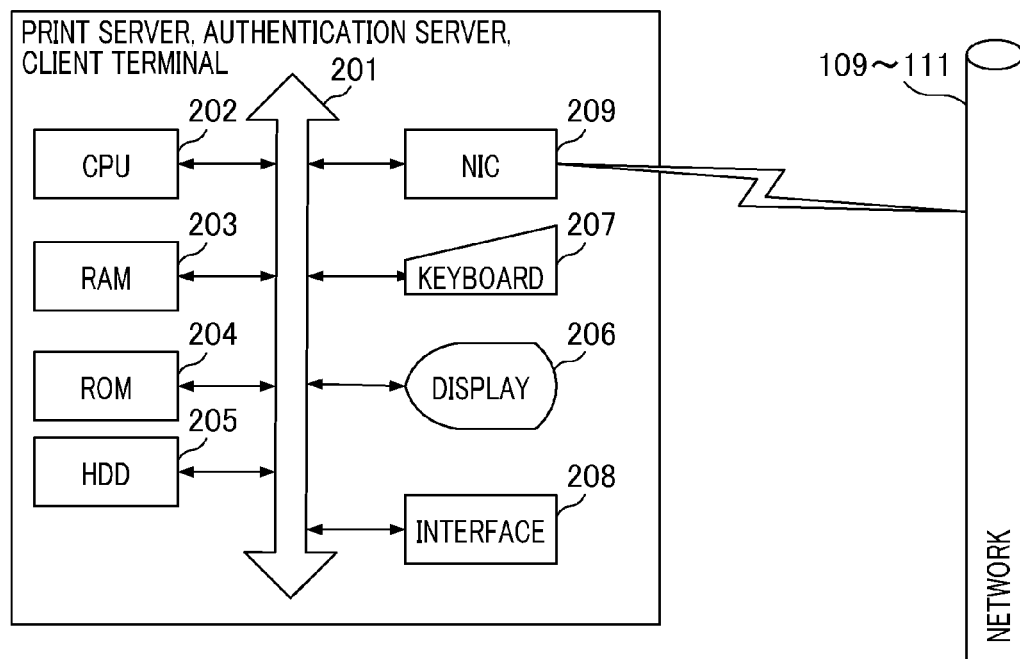
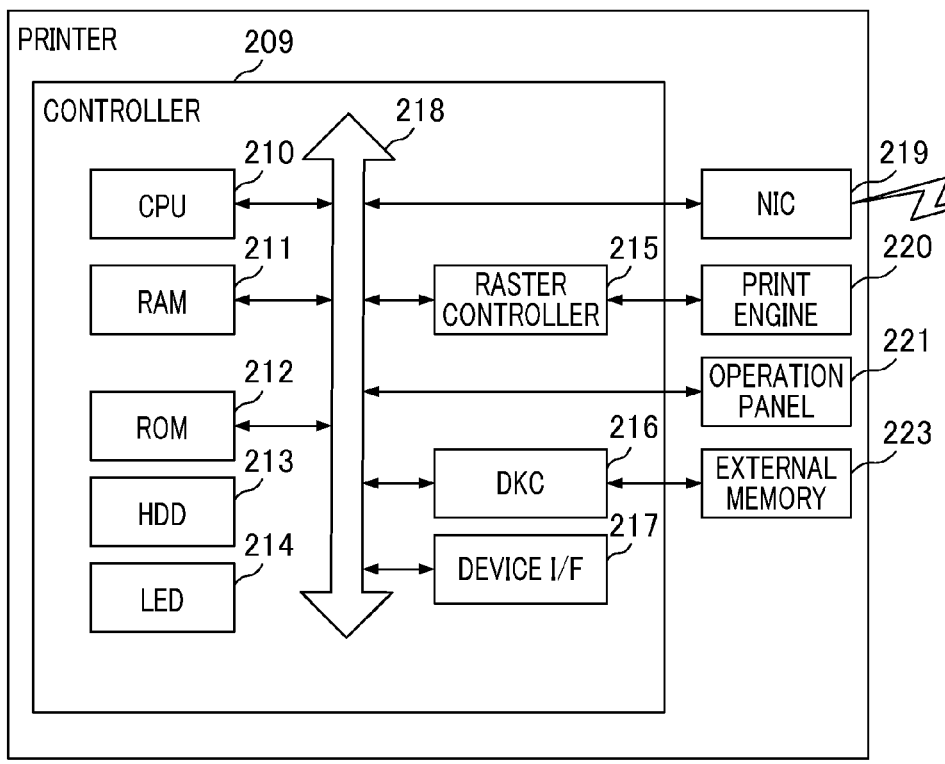

| User ID | Authentication token | Last accessed date/time | ... |
|---|---|---|---|
| ... | ... | ... | ... |

| Printer name | Printer identification information | Status | Last KeepAlive date/time | ... |
|---|---|---|---|---|
| ... | ... | ... | ... | ... |

| Job ID | Document name | Print status | ... |
|---|---|---|---|
| ... | ... | ... | ... |

| Execution job ID | JOB ID | Authentication token | Printer identification information | ... |
|---|---|---|---|---|
| ... | ... | ... | ... | ... |

| Authentication token | Execution job ID list |
|---|---|
| ... | ... |

| Job ID | URI | Authentication token | ... |
|---|---|---|---|
| ... | ... | ... | ... |

⋮

PRINT CONTROL DEVICE MANAGING A PRINT JOB BASED ON AN INSTRUCTION FROM A CLIENT TERMINAL

BACKGROUND OF THE INVENTION

1. Field of the Invention

The present invention relates to a print control device, a print control method, an information processing system, an information processing apparatus, an information processing method, and a storage medium. In particular, the present invention relates to a print control device, a print control method, an information processing system, an information processing apparatus, an information processing method, and a storage medium that update the expiration date/time of authentication information required for printing by a printer.

2. Description of the Related Art

In recent years, the publicizing of services on the Internet as cloud services has become an expanding business. Along with this, the function of a print server needs to be provided as a print service on the Internet. For example, providing print services as cloud services has various advantages such that the need for hardware management for each customer can be obviated by installing print servers in a large-scale data center, and a resource can be easily added in accordance with the load on the server.

Since a print service needs to collectively manage multiple user information, more robust user management is provided using an external authentication service. A user performs his/her authentication by means of an authentication service and uses an authentication token issued upon authentication to thereby be able to receive a print service. A print service deployed as a cloud service on the Internet resides in an environment where the print server communicates with a printer over a firewall. Thus, a printer acquires print data from the print server via the Internet to perform pull type printing. At this time, the authentication token of the user who has already been authenticated for print execution by the authentication service is registered in the printer. The printer can acquire print data through a request which has been properly authenticated by using the authentication token.

However, a typical authentication service sets an expiration date/time to an authentication token to be issued in order to use resources efficiently and improve security. More specifically, the authentication token becomes invalid after the elapse of a predetermined time from the last accessed time. Thus, if a user who executes a printing operation does not execute any other operation after providing a print instruction to a printer, the authentication token may become invalid until the printer acquires print data from a print server. If the authentication token becomes invalid, the printer cannot acquire print data, resulting in occurrence of a print error against a user's intention.

In order to avoid such circumstances, as an prior art, a client system which performs batch job processing for a long time sets an expiration date/time update time for an authentication ticket to be issued from an authentication system prior to the start of batch job processing. The system includes an expiration date/time update unit that updates the expiration date/time when the expiration date/time update time is reached after the start of batch job processing (e.g., Japanese Patent Laid-Open No. 2000-330953).

In the method disclosed in Japanese Patent Laid-Open No. 2000-330953, when expiration date/time information is managed by the authentication system, the client system makes an update request to the authentication system upon reaching the update time. In the case of cloud services, client systems (printers) and the authentication system (authentication server) are connected via the Internet and the number of client systems is too many, resulting in a heavy load on the network. Therefore, the method disclosed in Japanese Patent Laid-Open No. 2000-330953 is not practical.

SUMMARY OF THE INVENTION

The print control device of the present invention is a print control device that is capable of performing the required update by efficiently managing authentication information required by a printer in a print service deployed on the Internet.

According to an aspect of the present invention, a print control device for managing a print job and a printer based on an instruction from a client terminal is provided that includes a acceptance unit configured to accept a print instruction to the printer from the client terminal and authentication information about the client terminal; a confirmation unit configured to confirm the validity of the authentication information to an authentication unit configured to issue and manage the authentication information; a registration unit configured to register the print job as an execution job together with the authentication information if the authentication information is valid; and an update unit configured to access the authentication unit during registration of the execution job and update the expiration date/time of the registered authentication information.

Further features of the present invention will become apparent from the following description of exemplary embodiments with reference to the attached drawings.

BRIEF DESCRIPTION OF THE DRAWINGS

FIG. 2 is a diagram illustrating the hardware configuration according to an embodiment of the present invention.

FIGS. 5A to 5F are diagrams illustrating the configuration of information managed by an embodiment of the present invention.

DESCRIPTION OF THE EMBODIMENTS

First Embodiment

Figure 1:
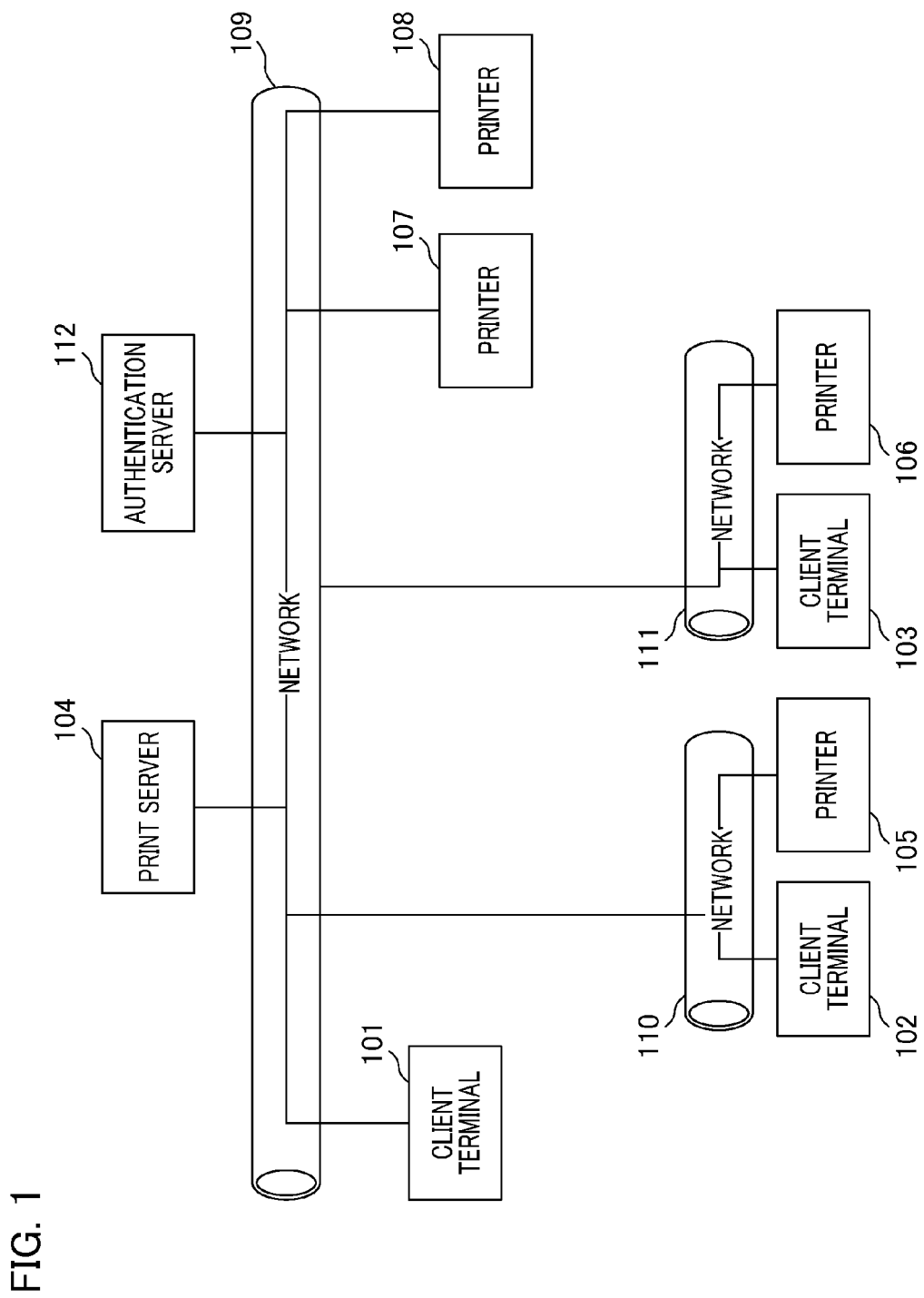
FIG. 1 is a diagram illustrating the overall configuration according to an embodiment of the present invention.

Hereinafter, preferred embodiments of the present invention will now be described in detail with reference to the accompanying drawings. FIG. 1 is a diagram illustrating the overall configuration according to an embodiment of the present invention.

In FIG. 1, client terminals 101 to 103, a print server (print control device) 104, printers 105 to 108, and an authentication server 112 are connected to each other via networks 109 to 111. In FIG. 1, a plurality of client terminals 101 to 103 and a plurality of printers 105 to 108 are connected to each other. The networks 109 to 111 may be any one of the Internet, a LAN, a WAN, a telephone line, a dedicated digital line, an ATM, a frame relay line, a cable television line, a data broadcasting wireless line, and the like. Alternatively, the networks 109 to 111 are so-called communication networks implemented by a combination of them. The networks 109 to 111 may be any communication network capable of transmitting and receiving data. Communication units from the client terminals 101 to 103 to the print server 104 and the printers 105 to 108 may differ from those from the printers 105 to 108 to the print server 104.

The client terminals 101 to 103 may be a desktop personal computer, a notebook personal computer, a mobile personal computer, a PDA (Personal Data Assistant), and the like. The client terminals 101 to 103 may be cell phones incorporating a program execution environment. The client terminals 101 to 103 incorporate an environment where a program such as a Web browser (Internet browser, WWW browser, or browser for using World Wide Web) is executed.

The authentication server 112 issues an authentication token to a request from the Web browser of the client terminals 101 to 103. When the print server 104 receives a print instruction from the Web browser of the client terminals 101 to 103, the print server 104 confirms an authentication server as to the validity of the authentication token included in the request for the print instruction. When the authentication token is valid, the print server 104 registers a set of a print execution job and the authentication token based on the content of the request to thereby create print data. At this time, the print server 104 creates print data (PDL) using a conversion module that performs a conversion into print data held by itself. The conversion module provided in the print server 104 has a function capable of accepting various data and converting the accepted data into data matched to the output device to be output.

Here, a description will be given of an example of the flow of printing performed by the print control device of the present invention. For example, a user accesses a sheet slip service using a client terminal, selects a desired printer with a sheet slip being displayed, and provides a print instruction thereto. Through the instruction, the sheet slip displayed on the client terminal is transmitted as document data from a sheet slip server providing the sheet slip service to the print server 104. The print server 104 creates print data from the document data (e.g., PDF) and holds the created print data. Since a user has already selected a printer prior to the provision of a print instruction, the print server 104 can provide a print setting screen, which is matched to the function of the selected printer, to the client terminal. For example, when the printer selected by a user includes a stapling function, a print setting screen in which the stapling function can be selected is provided from the print server 104 to the client terminal. On the other hand, when the selected printer does not have a stapling function, a print setting screen in which the stapling function cannot be selected is provided from the print server 104 to the client terminal.

The Web browser of each of the client terminals 101 to 103 registers a pull-print job including an authentication token in each of printers 102 to 108. In accordance with the content of the pull-print job, each of the printers 102 to 108 transmits a print data acquisition request to the print server 104. Upon receiving the print data acquisition request from each of the printers 102 to 108, the print server 104 confirms an authentication server as to the validity of the authentication token included in the print data acquisition request. When the authentication token is valid, the print server 104 transmits the created print data to each of the printers 102 to 108.

FIG. 2 is a diagram illustrating the hardware configurations of the client terminals 101 to 103, the print server 104, the authentication server 112, and the printers 105 to 108 according to an embodiment of the present invention. In FIG. 2, the reference number 202 indicates a CPU that controls the whole apparatus. The CPU 202 performs control to execute an application program, OS, and the like stored in a hard disk (HDD) 205 and temporarily store information, files, and the like necessary to execute the programs in a RAM 203. The reference number 204 indicates a ROM serving as a storage unit. The ROM 204 stores programs such as a basic I/O program and various data such as print data used for print processing and printer information. The reference number 203 indicates a RAM serving as a temporary storage unit. The RAM 203 functions as a main memory, a work area, and the like for the CPU 202. The reference number 205 indicates a hard disk (HDD). The HDD 205 is one of external storage units and functions as a large-capacity memory. The external storage unit 205 stores application programs such as a Web browser, a print server program, an authentication server program, an OS, related programs, and the like.

The reference number 206 indicates a display serving as a display unit. The display 206 displays a command input from a keyboard 207, a printer status, and the like. The reference number 208 indicates an external device I/F. The external device I/F 208 is used to connect a printer, a USB device, and a peripheral device. The reference number 207 indicates a keyboard serving as an instruction input unit. The reference number 201 indicates a system bus. The system bus 201 manages a data flow within the print server, the authentication server, and the client terminal in the print system. The reference number 209 indicates a network interface card (NIC). Data is exchanged with an external device via the interface 209 and the networks 109 to 111. This computer configuration is merely an example, and the configuration is not limited to the configuration example shown in FIG. 2. For example, the storage destination of data and programs can be changed to a ROM, a RAM, an HDD, or the like in accordance with their features.

The reference number 209 indicates a controller in each of the printers 105 to 108. The controller 209 is a device that controls a printer control function. The reference number 210 indicates a CPU which controls the overall apparatus. The CPU 210 comprehensively controls accesses to various devices connected to a system bus 218. The control by the CPU 210 is based on a control program and the like which are stored in a ROM 212, or a control program, resource data (resource information), and the like which are stored in an external memory 223 connected via a disk controller (DKC 216). The reference number 211 indicates a RAM functioning as a main memory, work area, and the like for the CPU 210. The RAM 211 can expand the memory capacity by an optional RAM connected to an expansion port (not shown).

The reference number 213 indicates an external storage unit functioning as a large-capacity memory. The external storage unit 213 stores a pull-print application program, related programs, and the like. The reference number 221 indicates an operation panel (operation unit). The operation panel 221 includes a user interface and pull-print switching button for performing a pull-print operation. The operation panel 221 also includes buttons and a display unit such as a liquid crystal panel or LED 214 for setting the operation mode of a corresponding one of the printers 105 to 108 and the like, displaying the operation status of a corresponding one of the printers 105 to 108, and performing an operation such as copy designation. The reference number 219 indicates a network interface card (NIC). Data is exchanged with an external device via the interface 219.

A print engine 220 shown in FIG. 2 adopts a known printing technique. In the preferred embodiment, examples such as an electrophotographic method (laser beam method), an inkjet method, and a sublimation (thermal transfer) method are included. A raster controller 215 is a controller that converts print data of the PDL or PDF language into image data. A device I/F 217 is a connection I/F with an external device connectable via a USB or the like.

Figure 3:
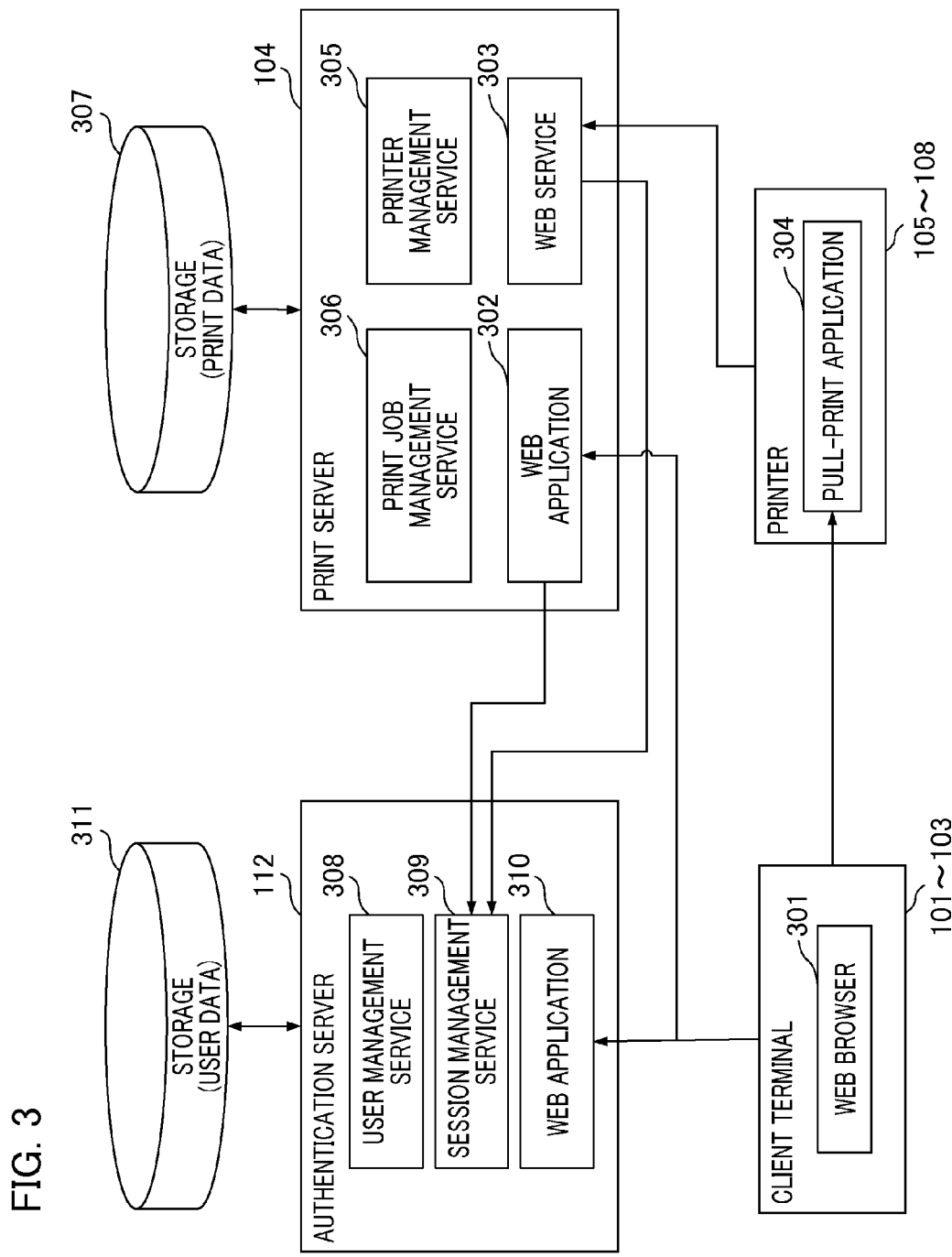
FIG. 3 is a diagram illustrating the module configuration according to an embodiment of the present invention.

FIG. 3 is a diagram illustrating the module configuration according to an embodiment of the present invention. The print server 104 includes a print job management service 306 that manages a print job. The print job management service 306 manages document data or the like input by another service or another program as print data in a storage 307. The data format of print data is, for example, PDL (Page Description Language) or PDF (Portable Document Format). The storage 307 is a storage device such as an HDD incorporated in the information processing apparatus of the print server 104, an externally connected HDD, or network storage. A printer management service 305 manages the printers 105 to 108, and manages printer information (to be described below) for each printer.

A Web application 302 creates a Web page displayable on a Web browser 301 running on each of the client terminals 101 to 103, and sends back the created Web page in response to a request from the Web browser 301. In response to a print job acquisition request from a pull print application 304 in each of the printers 105 to 108, a Web service 303 sends back print data or receives a job status in print processing. The pull-print application 304 in each of the printers 105 to 108 accepts a printer control command (e.g., a print stop instruction command to a printer) or a print instruction command from the Web browser 301.

The print job management service 306, the printer management service 305, the Web application 302, and the Web service 303 are independent programs, and can be arranged in separate information processing apparatuses. These programs are installed on a plurality of information processing apparatuses that are connected through the network, and thus, communication between programs is realized. These programs may also be installed on the same information processing apparatus.

The authentication server 112 includes a user management service 308 that manages user information. The user management service 308 manages information about a user who uses the print system in storage 311. The storage 311 is a storage device such as an HDD incorporated in the information processing apparatus of the authentication server, an externally connected HDD, or network storage. A Web application 310 creates a Web page displayable on the Web browser 301 running on each of the client terminals 101 to 103, and sends back the created Web page in response to a request from the Web browser 301. A session management service 309 issues and manages an authentication token.

Figure 4A:
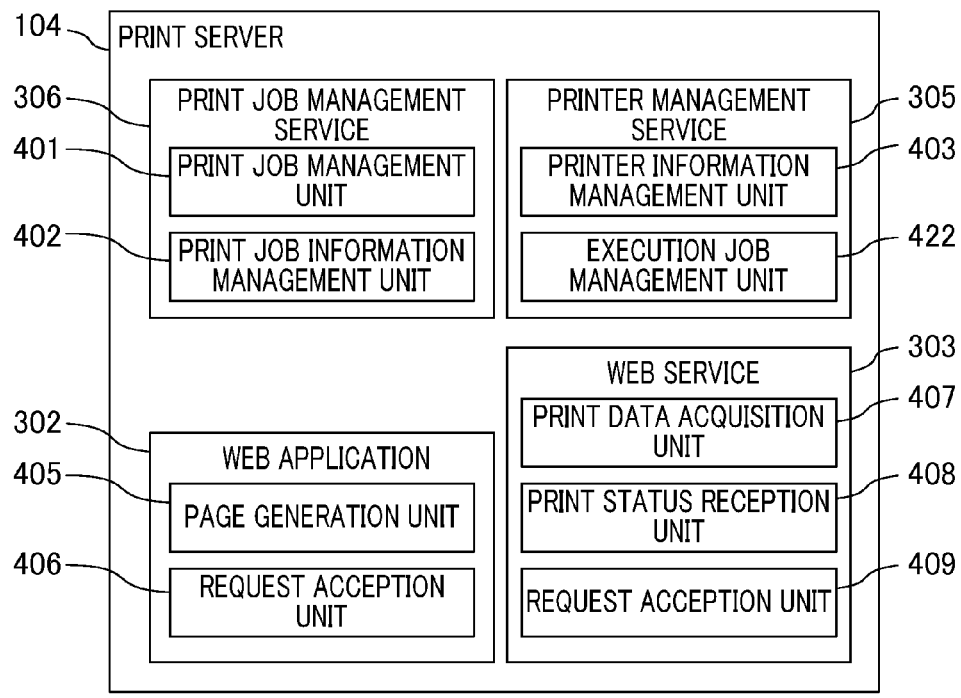
FIGS. 4A to 4C are diagrams illustrating the software configuration according to an embodiment of the present invention.
Figure 4B:
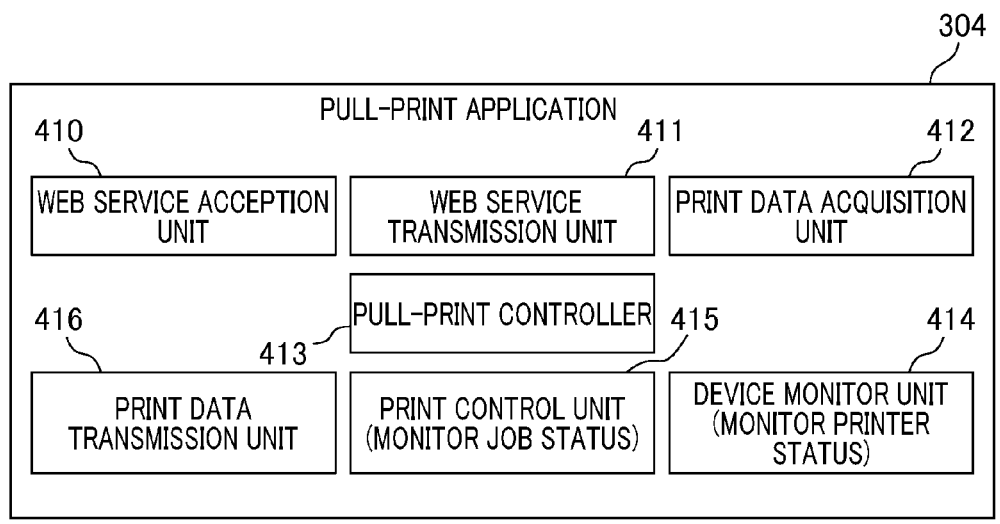
Figure 4C:
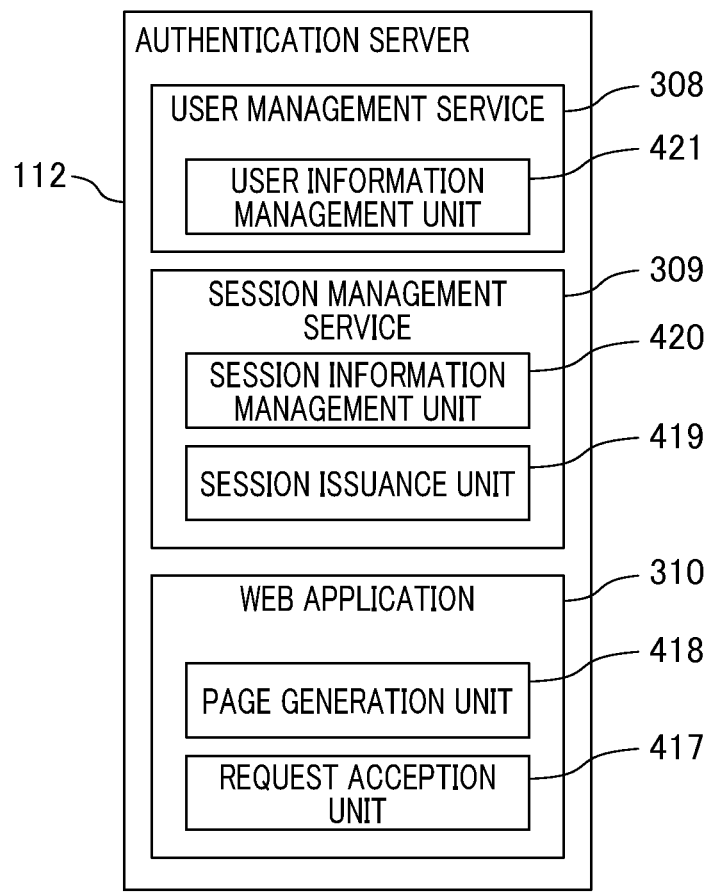

FIGS. 4A to 4C are diagrams illustrating the software configuration of a group of devices relating to an embodiment of the present invention. In FIG. 4A, a print data management unit 401 of the print job management service 306 included in the print server 104 manages a print job. In other words, upon receiving a print data acquisition request from the Web service 303, the print job management unit 401 acquires the designated print data from the storage 307, and transfers it to the Web service 303. A print job information management unit 402 manages print job information, which is shown in FIG. 5C to be described below, relating to print data managed by the storage 307. A printer information management unit 403 in the printer management service 305 manages printer information (to be described below) shown in FIG. 5B. Upon accepting a print instruction request from the Web browser 301, the Web application 302 notifies the printer management service 305 of the effect. The printer management service 305 that has received the notification determines the target printer based on printer identification information 503 in printer information (to be described below) shown in FIG. 5B. Since the print instruction request includes information about a printer selected by a user using the Web browser of the client terminal, the printer management service 305 determines the printer based on the information. At this time, the execution job information management unit 422 further registers information about an execution job in the execution job information (to be described below) shown in FIG. 5D.

A request acceptance unit 406 in the Web application 302 inquires the authentication server 112 as to the validity of the authentication token included in the request from the Web browser 301. A page generation unit 405 creates a Web screen on which buttons or the like for providing a print instruction are arranged in response to a request from the Web browser 301, and sends it back to the Web browser 301. A request acceptance unit 409 in the Web service 303 accepts a print data acquisition request and a print job status from the pull-print application 304. Upon accepting a print data acquisition request, the request acceptance unit 409 inquires the authentication server 112 as to the validity of the authentication token included in the request. When the request acceptance unit 409 accepts a print job acquisition request, a print job acquisition unit 407 issues a print data acquisition request to the print job management service 306 described above. When the request acceptance unit 409 accepts a print job status, a print status reception unit 408 notifies the printer management service 305 of the status.

In FIG. 4B, a Web service acceptance unit 410 in the pull-print application 304 accepts a print instruction command, a printer control command, and the like from the Web browser 301. A Web service transmission unit 411 notifies the Web service 303 of the print job acquisition request or print status. Upon accepting a print request or the like from the Web browser 301, a print data acquisition unit 412 acquires a print data from the Web service 303 via the Web service transmission unit 411, and sends it to a print data transmission unit 416. The print data transmission unit 416 transmits print data to the controller 209. A print control unit 415 receives a print job status from the controller 209, and notifies the Web service 303 of it. A device monitor unit 414 acquires a printer status from the controller 209, and notifies the print server 104 of it as a regular communication (KeepAlive). The regular communication (KeepAlive) is notified from a printer to a print server at a predetermined regular interval. The printer status is managed by the status of the printer information (to be described below) shown in FIG. 5B. A pull-print controller 413 manages the overall operation of the pull-print application 304, and operation instructions and the like are issued to respective units via this controller.

In FIG. 4C, a request acceptance unit 417 in the Web application 310 of the authentication server 112 accepts a request for authentication from the Web browser 301. A page generation unit 418 creates a Web screen for inputting user information required for authentication, and sends it back to the Web browser 301. A session issuance unit 419 verifies the user information accepted by the Web application 310 using a user information management unit 421, and issues an authentication token when the authentication is successful. A session information management unit 420 manages the session management information (to be described below) shown in FIG. 5A including the authentication token issued from the session issuance unit 419. Also, the session information management unit 420 returns a response indicating whether or not the authentication token is valid to the inquiry about the validity of the authentication token and updates the last accessed date/time of session information corresponding to the inquired authentication token. The update of the last accessed date/time by the session information management unit 420 means the update of the expiration date/time of the authentication token. The details of which will be described below.

FIGS. 5A to 5F are diagrams illustrating the configuration of information managed by an embodiment of the present invention. In FIG. 5A, session management information 501 is managed by the session information management unit 420 in the authentication server 112, and includes a user ID for identifying a user, an authentication token issued upon authentication, the last date/time accessed with the authentication token, and the like.

As shown in FIG. 5B, printer information 502 manages printer information of a plurality of the printers 105 to 108 that are managed in the print server 104. Printer information 502 includes a printer name, printer identification information, status, last KeepAlive date/time, and the like. The printer identification information is information for uniquely identifying each printer, and is an IP address, a MAC address, an URI (Uniform Resource Identifier), or the like. Status indicates a printer status and examples of the status include the absence of paper, paper jam, opening of the cover, the absence of toner, full discharge bin, full hard disk, and other errors. Other examples of the status include warming-up, calibrating, initializing, off-line, sleep, printing, printable, unknown status, and the like.

As shown in FIG. 5C, print job information 503 is management information about a job which is managed by the print job management unit 401 in the print server 104 and is stored in the storage 307. The print job information includes a job ID for identifying a job, a document name, a print status, and the like. The print status includes waiting, transferring, printing, canceling, normal end, cancel end, error end, and the like.

As shown in FIG. 5D, execution job information 504 is information relating to a print execution job which is managed by the execution job management unit 422 in the print server 104. The execution job information 504 includes an execution job ID for identifying an execution job, a job ID for identifying the print job information 503 to be printed, an authentication token to be used upon acquisition of print data, printer identification information, and the like.

As shown in FIG. 5E, an authentication token update list 505 is information including an authentication token and an execution job list for each authentication token extracted from the execution job information 504.

As shown in FIG. 5F, print queue information 506 is print job information to be managed by the pull-print application 304 for a printer. The print queue information 506 includes information to be used upon acquisition of print data by the print data acquisition unit 412, such as a job ID for identifying a print job, the acquisition destination URI of print data, an authentication token for a job execution user, and the like.

FIGS. 6A to 6E are diagrams illustrating the operation flow of the print server 104 which is a print control device according to an embodiment of the present invention. The flowchart of the present invention is realized by reading and executing a program relating to the processing from the memory via the CPU of each device.

In step S601, the request acceptance unit 406 accepts a print instruction from the Web browser 301 on each of the client terminals 101 to 103. In step S602, the request acceptance unit 406 inquires the session information management unit 420 in the authentication server 112 as to the validity of the authentication token included in the print instruction. When it is determined in step S602 that the authentication token is valid, the execution job management unit 422 registers execution job information including the authentication token in step S603. In other words, the execution job management unit 422 functions as a registration unit. In step S604, the print job information management unit 402 prepares the corresponding print data. More specifically, the print job information management unit 402 requests the conversion module described above to convert document data (e.g., PDF) stored in storage into print data (PDL). Here, the converted print data is stored in the storage.

In step S605, the request acceptance unit 409 accepts a print data acquisition request from the print data acquisition unit 412 in the pull-print application 304. In step S606, the request acceptance unit 409 inquires the session information management unit 420 in the authentication server 112 as to the validity of the authentication token included in the print data acquisition request. When it is determined in step S606 that the authentication token is valid, the print server 104 transmits print data to the print data acquisition unit 412 in step S607 and the print server 104 updates the print status of the print job information 503 to "printing" in step S608. When it is determined in step S606 that the authentication token is invalid, in step S609, the print server 104 sets the print status of the print job information 503 to "error end" and deletes information about the corresponding execution job from the execution job information 504.

In step S610, the print status reception unit 408 receives a print completion notification from the Web service transmission unit 411 in the pull-print application 304. In accordance with the print completion notification received in step S610, in step S611, the print job management unit 401 updates the print status of the corresponding job in the print job information 503 to "printed". In step S612, the execution job management unit 422 deletes the corresponding job information from the execution job information 504.

In step S613, the print status reception unit 408 also receives regular communication (KeepAlive) from the Web service transmission unit 411 in the pull-print application 304. In step S614, the printer information management unit 403 updates the status of the printer information 502 and the last KeepAlive date/time.

Figure 6B:
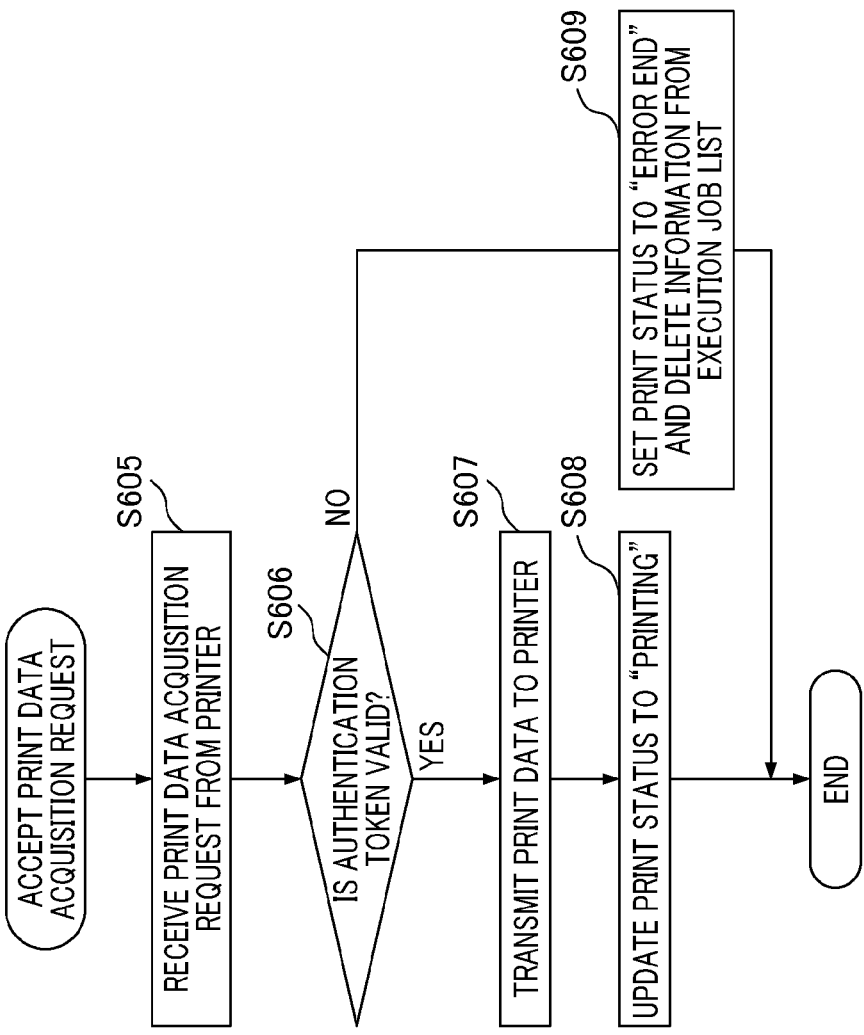
FIGS. 6A to 6E are diagrams illustrating the operation flow of a print server according to an embodiment of the present invention.
Figure 6A:
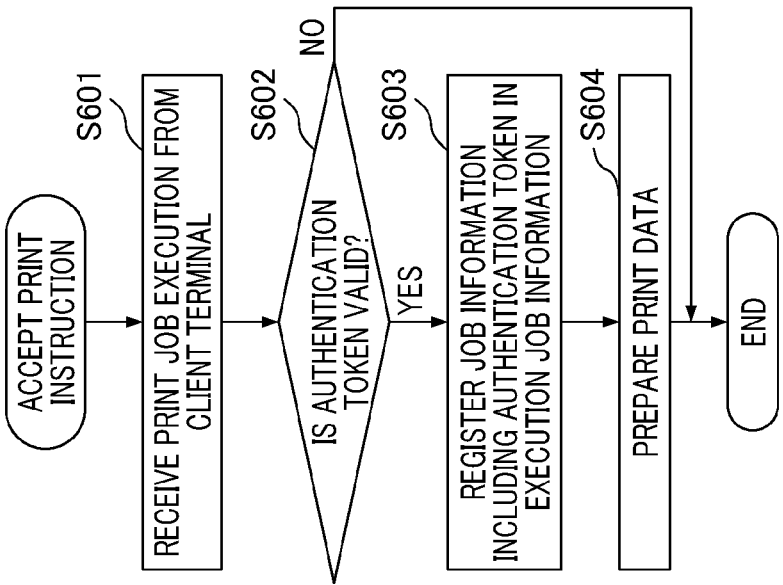
Figure 6C:
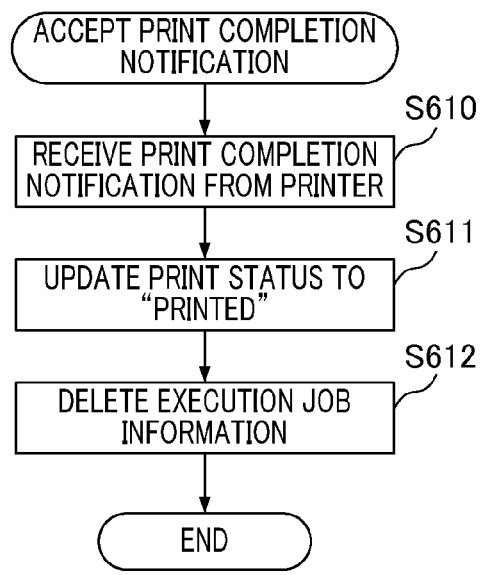
Figure 6D:
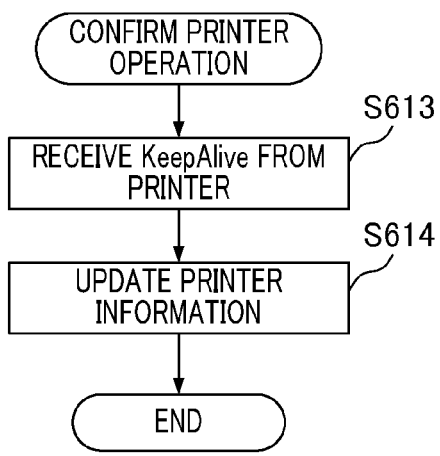
Figure 6E:
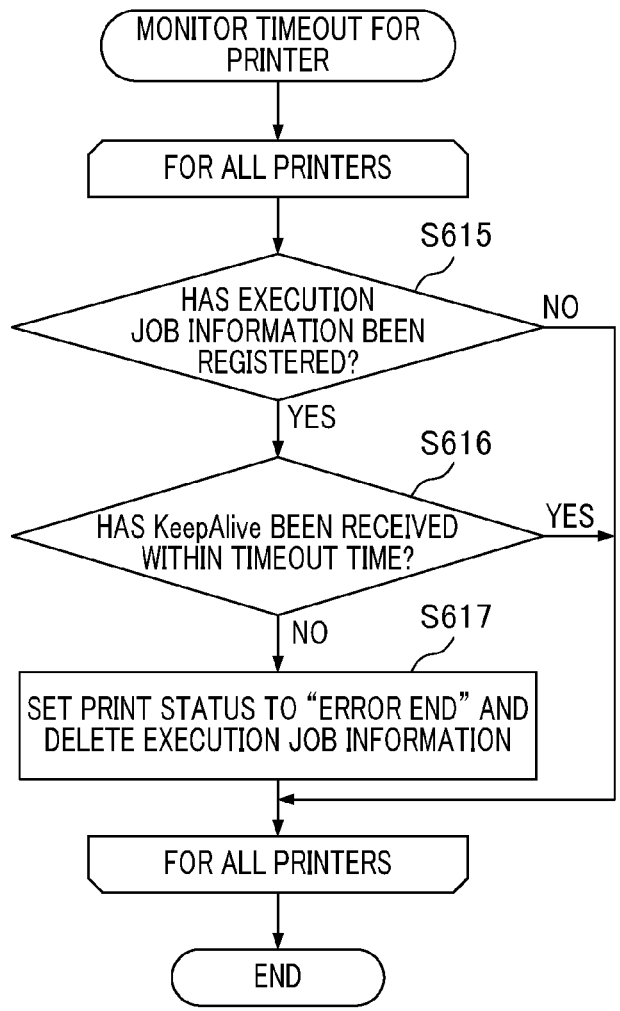

The printer information management unit 403 in the print server 104 performs the following processing for all of the printer information 502 under management at regular intervals. Firstly, in step S615, the printer information management unit 403 confirms whether or not an execution job which is output to the target printer set as the output destination is present from the execution job information 504. When it is determined in step S615 that an execution job is present, the printer information management unit 403 acquires the last KeepAlive date/time from the printer information 502 in step S616. The printer information management unit 403 confirms whether or not KeepAlive has been received from the printer prior to the elapse of a predetermined timeout time from the acquired date/time. When it is determined in step S616 that the timeout time has already been passed, the printer information management unit 403 sets the print status of the print job information 503 corresponding to all execution jobs which are output to the printer set as the output destination to "error end" and deletes the corresponding execution job information. In other words, when KeepAlive, which is notified from a printer at regular intervals, is not notified within a predetermined timeout time (when KeepAlive is not notified even after the elapse of a predetermined time), normal printing cannot be made due to the printer power OFF, the cutoff of the network, and the like. In this case, a print job cannot be executed by a printer which is not running in its normal mode, and thus, the print server 104 performs processing as shown in FIG. 6E. In the present invention, processing for updating the validity time period of an authentication token to be described below is performed for each user corresponding to an execution job. Thus, unnecessary update processing for a validity time period may be avoided by deleting an execution job which is not required at a current stage.

Figure 7B:
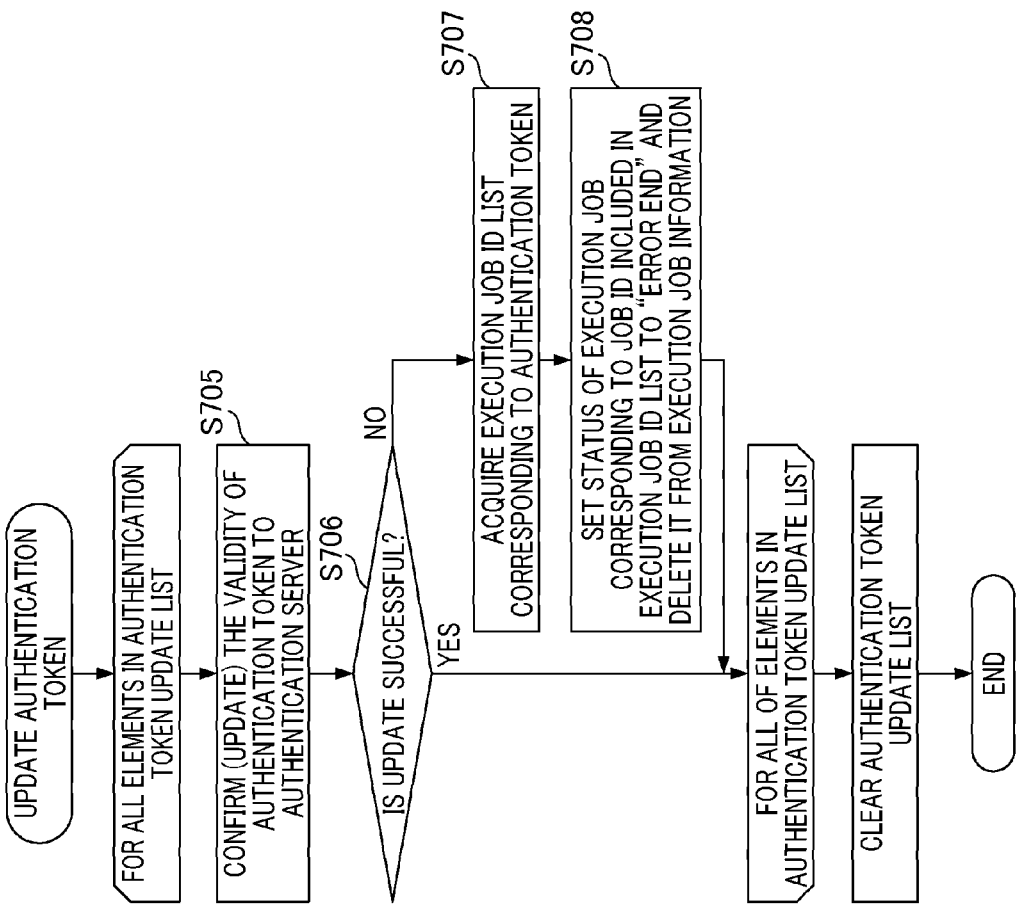
FIGS. 7A and 7B are diagrams illustrating the operation flow performed by a print server according to an embodiment of the present invention.
Figure 7A:
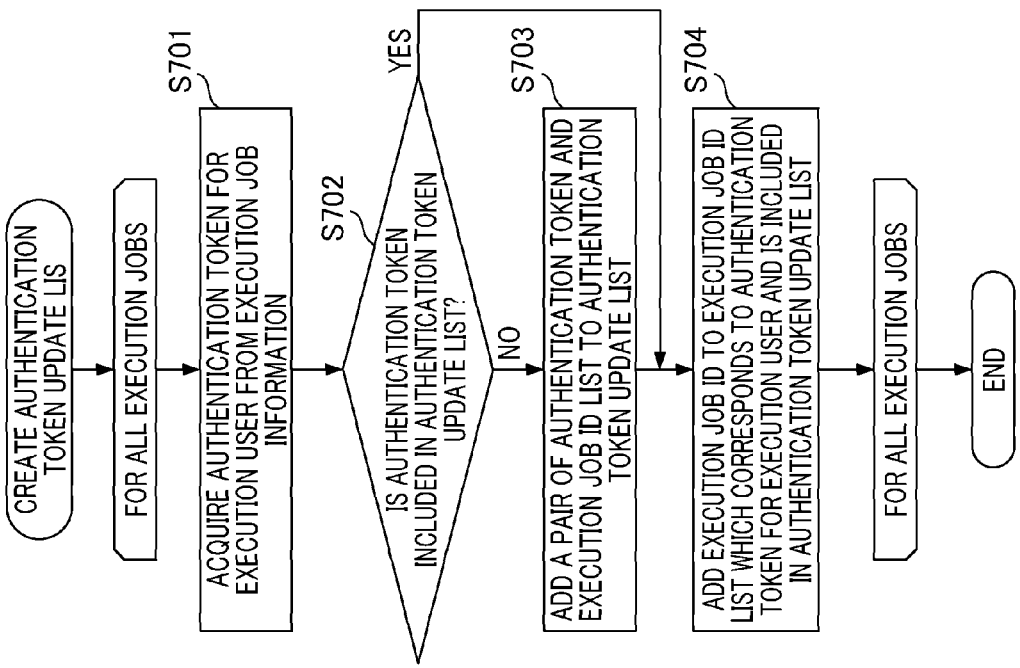

FIGS. 7A and 7B are diagrams illustrating the operation flow performed by the execution job management unit 422 in the print server 104 according to an embodiment of the present invention. The operation flow is periodically executed at a predetermined execution interval in order to maintain the validity of the authentication token for a job registered in an execution job. The execution interval is determined on the basis of the validity time period, which has been determined by the authentication server 112, until the authentication token is invalidated after the elapse of a predetermined time from the date/time of last access to session information. For example, when the validity time period of the authentication token is 30 minutes, the processing shown in FIGS. 7A and 7B is executed at 15 minutes interval (i.e., the value obtained by dividing the validity time period by two) in the present embodiment.

When a plurality of execution jobs is registered in the execution job information 504, the execution job management unit 422 firstly acquires the authentication token of the execution job information 504 for all of the execution jobs in step S701. Next, in step S702, the execution job management unit 422 confirms whether or not the authentication token acquired in step S701 is included in the authentication token update list 505. When the execution job management unit 422 has determined in step S702 that the acquired authentication token is not included in the authentication token update list 505, the execution job management unit 422 adds the pair of the authentication token and its execution job ID list to the authentication token update list 505. On the other hand, when the execution job management unit 422 has determined in step S702 that the acquired authentication token is included in the authentication token update list 505, the execution job management unit 422 does not perform any processing, and the process advances to step S704.

In step S704, the execution job management unit 422 adds the execution job ID to the execution job ID list which corresponds to the authentication token acquired in step S701 and is included in the authentication token update list 505. In the present invention, one authentication token is issued to one user. Hence, when a user instructs execution of a plurality of print jobs, a plurality of execution jobs ID is associated with one authentication token in step S704 for management.

Next, for all of the elements in the authentication token update list 505 created in steps S701 to S704, the execution job management unit 422 inquires the session information management unit 420 in the authentication server 112 as to the validity of the authentication token in step S705. Note that all of the elements in the present invention indicate all of the authentication tokens included in the items of the authentication token in the authentication token update list 505. Thus, when two users instruct execution of a print job, the number of authentication tokens to be inquired is two. In step S706, the execution job management unit 422 determines whether or not the result obtained in step S705 is successful based on a reply from the session information management unit 420. When the result obtained in step S705 is successful, the session information management unit 420 updates the last accessed date/time in the session management information 501.

In the present embodiment, the validity time period of the authentication token is set as a predetermined time from the last accessed date/time. Thus, the last accessed date/time of the authentication token is updated by executing the processing shown in FIGS. 7A and 7B at regular intervals. Consequently, the expiration date/time of the authentication token is further prolonged. As an example, when the validity time period of the authentication token is 30 minutes, the expiration date/time of the authentication token is prolonged for 30 minutes. Indirect management of the expiration date/time of the authentication token based on the last accessed date/time eliminates the need for newly setting a management element "expiration date/time" to an authentication server, and exhibits high affinity to existing authentication servers. Also, the expiration date/time of the authentication token is updated only by simply accessing the authentication server 112, that is, by querying the validity of the authentication token. Consequently, the expiration date/time can be efficiently updated by using a simple flowchart. In the present embodiment, the expiration date/time is managed based on the last accessed date/time, but the present invention is not limited thereto. The session information management unit 420 may also directly manage the expiration date/time so as to rewrite the expiration date/time itself.

When it is determined in step S706 that the result obtained in step S705 is a failure, the execution job management unit 422 sets the print status of print job information, which corresponds to all of the execution job IDs included in the execution job ID list corresponding to the authentication token in step S707, to "error end" in step S708. Also, the execution job management unit 422 deletes the corresponding execution job information from the execution job information 504. Finally, in step S709, the execution job management unit 422 clears all of the content in the authentication token update list 505.

In the present embodiment, the execution job management unit 422 executes the flowchart shown in FIGS. 7A and 7B at an interval obtained by dividing the validity time period of the authentication token by two, but the present invention is not limited thereto. The flowchart may be executed at any appropriate timing during which an execution job is being registered in the execution job information 503. For example, the expiration date/time may be updated at irregular intervals or at intervals which are different for each execution job or each printer.

As described above, according to the present embodiment, the user authentication token is not invalidated in spite of the occurrence of the waiting time for a print job or the waiting time caused by errors such as the absence of paper, paper jam, or the like. Thus, a printer can execute normal printing using the authentication token which has been received together with a pull-print job from the client terminal. Additionally, according to the present embodiment, a print server updates the expiration date/time of an authentication token. Thus, the present embodiment can be applied to a cloud service deployed on the Internet without placing a heavy load on a client terminal and a network.

Second Embodiment

Next, a description will be given of a second embodiment of the present invention. In the second embodiment, upon receiving a print instruction from the Web browser 301 on each of the client terminals 101 to 103, the print server 104 requests the issuance of a second authentication token to the authentication server 112. More specifically, in the first embodiment, the execution of a print job is managed by using the authentication token of an execution user. Thus, when a user logs out from the print system prior to the execution of the print job created by the issuance of a print instruction from a client terminal by the user, the authentication server changes the authentication token of the logged-out user to invalid. Consequently, normal printing is no longer performed when a printer issues a print data acquisition request for a print job after the user has logged out.

In view of the aforementioned circumstances, in the second embodiment, the authentication token of an execution user and another authentication token are used. Consequently, even when a user's authentication token is explicitly invalidated by a user's operation (e.g., log-off operation), the printing is normally executed without invalidating the authentication token included in the execution job information 504.

Figure 8:
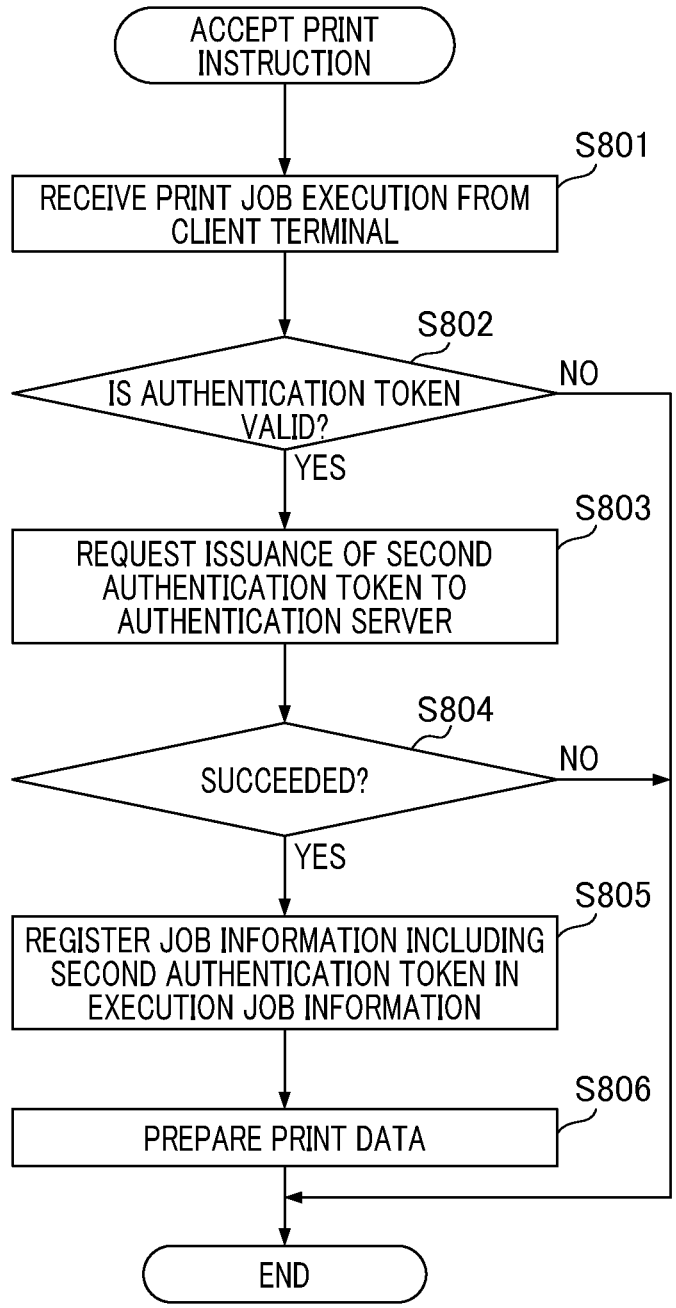
FIG. 8 is a diagram illustrating the execution job registration flow performed by a print server according to a second embodiment of the present invention.

FIG. 8 is a diagram illustrating the operation flow performed by the execution job management unit 422 in the print server 104 upon receiving a print instruction from the Web browser 301 on each of the client terminals 101 to 103 according to the second embodiment.

In step S801, the request acceptance unit 406 in the print server 104 receives a print instruction from the Web browser 301. In step S802, the request acceptance unit 406 inquires the session information management unit 420 in the authentication server 112 as to the validity of a user's authentication token included in a request. When it is determined in step S802 that the user authentication token is valid, the execution job information management unit 422 requests the issuance of a second authentication token to the session issuance unit 419 in the authentication server 112 in step S803. In step S804, the execution job information management unit 422 determines whether or not the issuance of a second authentication token is successful based on a reply from the session issuance unit 419.

When it is determined in step S804 that the issuance of a second authentication token is successful, the execution job management unit 422 registers execution job information including second authentication information in the execution job information 504. Furthermore, in step S806, the print job information management unit 402 prepares the corresponding print data.

As described above, according to the second embodiment, even when the user authentication token is invalidated, the second the authentication token is not invalidated. Thus, according to the second embodiment, a printer can execute normal printing. Additionally, according to the present embodiment, a print server updates the expiration date/time of an authentication token. Thus, the present embodiment can be applied to a cloud service deployed on the Internet without placing a heavy load on a client terminal and a network.

Third Embodiment

Hereinafter, a description will be given of a third embodiment of the present invention with reference to the drawings. In the first embodiment and the second embodiment, a description has been given of a method for updating the expiration date/time of the authentication token for a print job of interest before the authentication token is invalidated upon reaching the expiration date/time. According to another embodiment, a print system for realizing Google Cloud Print using an inexpensive inkjet printer is starting to be practically implemented. Such a print system uses an authentication (access) token (hereinafter referred to as "access token" in the present embodiment) when a print job is issued and processed. Assume that the expiration date/time of an access token is set to, for example, 24 hours. In this case, there may be a limitation on an authentication system such that the access token for the print job cannot be updated upon reaching the expiration date/time.

In the aforementioned example, a user activates application (Google Docs, Gmail, and the like), opens a document, and provides a print instruction using Google Cloud Print (registered trademark, hereinafter referred to as "GCP"). In this manner, a print job is issued and application for providing an image conversion service converts a print image which is stored in the print job as a PDF file into print data having an image format such as a JPEG file or the like which can be rendered by an inexpensive printer. Then, a printer acquires the print data for printout. At this time, the time from the issuance of a print job to completion of printing all pages included in print data using a printer needs to be shorter than the valid time period (e.g., 24 hours) of an access token.

In such a print system, if a printer is left alone for 24 hours or more in spite of the absence of paper or the absence of ink during printing using GCP, printing ends in failure. Hence, there is a functional limitation (specification) such that a user needs to activate application again, opens the document, and provides a print operation to thereby reissue a print job. In order to avoid this functional limitation (specification) as much as possible, a print system that acquires an access token again each time printing is performed so as to always maximize the expiration date/time (e.g., 24 hours) of an access token is contemplated. In the information processing system, the risk of printing failure may be lowered a little bit but an access token needs to be issued each time. Thus, a large amount of time may be required for access token issuance processing or use resource associated with the issuance of an access token may be increased. In particular, as an example of a typical use case, assume that a plurality of documents is sequentially printed in a short time (a few minutes). In this case, the load placing on the information processing system increases with an increase in use resource associated with the issuance of an access token for each print job despite the fact that almost the same risk of printing failure is expected.

In the third embodiment, a description will be given with respect to the information processing system for avoiding the aforementioned circumstances. The embodiment is not intended to limit the present invention, but all of the configurations described in the third embodiment are not necessarily the components that are required for avoiding the aforementioned circumstances.

In the following, although there is a case in which an SSL-encrypted HTTPS POST method (an exemplary communication scheme) is used for a Web service API, the POST method is general public information, and thus, the detailed description thereof will be omitted. Also, although there is a case in which an HTTPS GET method is used for a Web service API, the GET method is general public information, and thus, the detailed description thereof will be omitted. Also, although there is a case in which an SSL-encrypted HTTPS GET method (exemplary communication scheme) is used for a Web service API, the GET method is general public information, and thus, the detailed description thereof will be omitted.

Figure 9:
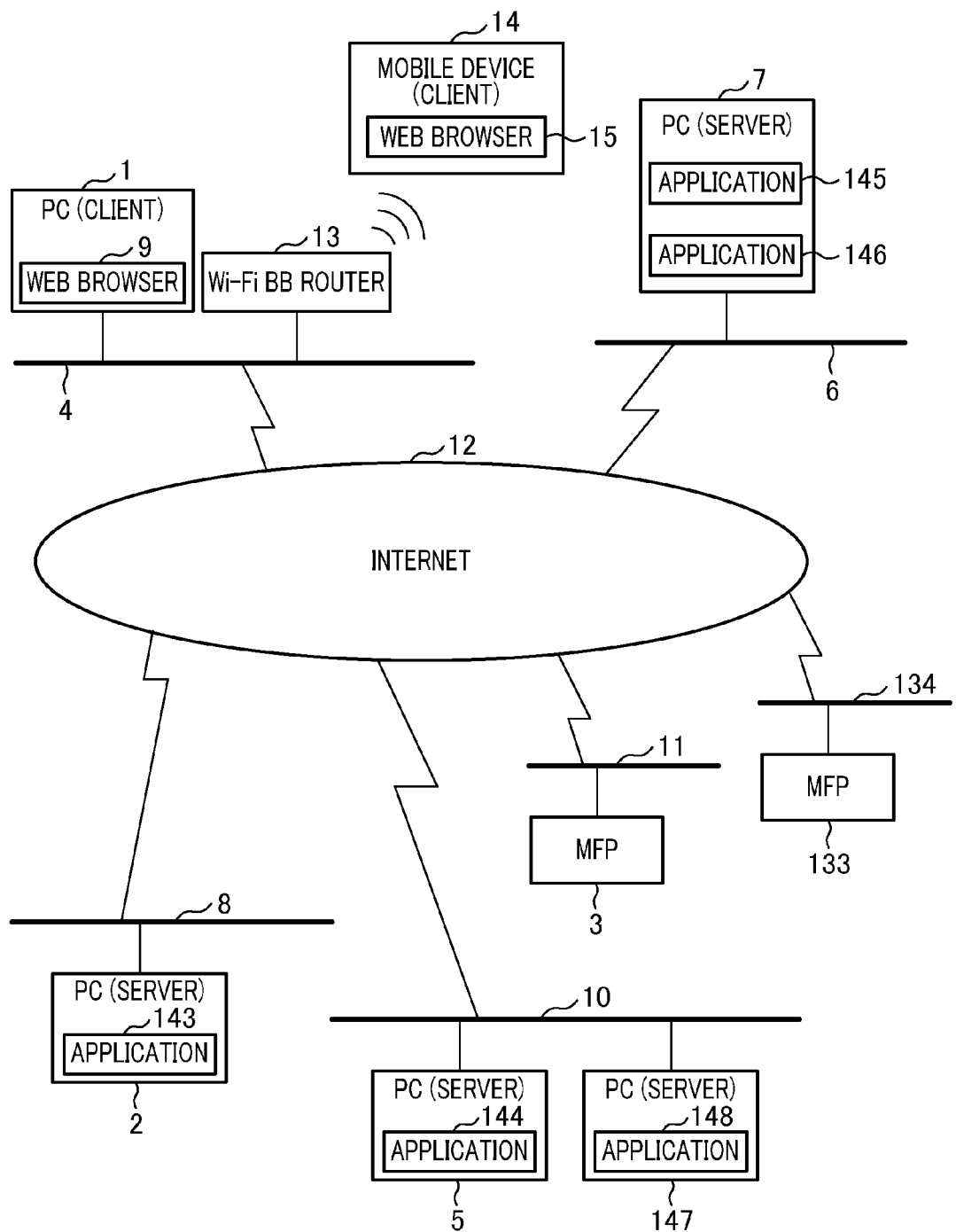
FIG. 9 is a diagram illustrating an example of the configuration of an information processing system.

HTTP is an abbreviation for Hyper Text Transfer Protocol and is a known unencrypted communication protocol, and thus, the detailed description thereof will be omitted. HTTPS is an abbreviation for Hyper Text Transfer Protocol over Secure Socket Layer and is a known encrypted communication protocol, and thus, the detailed description thereof will be omitted. SSL is an abbreviation for Secure Socket Layer and is a known method for encrypting and transmitting/receiving data on the Internet, and thus, the detailed description thereof will be omitted. Since the description relating to GCP is disclosed in the following site, the detailed description thereof will be omitted. Internet URL: http://code.google-.com/apis/cloudprint/docs/overview.html FIG. 9 is a diagram illustrating an example of the configuration of an information processing system of the present embodiment. Each of a PC 1, a PC 2, a PC 5, a PC 147, and a PC 7 provided in the information processing system shown in FIG. 9 is an exemplary information processing apparatus (computer) such as a general personal computer. Each of the PC 1, the PC 2, the PC 5, the PC 147, and the PC 7 includes hardware as shown in the print server, the authentication server, and the client terminal in FIG. 2.

The Operating System (hereinafter abbreviated as "OS") equivalent to Chrome (registered trademark) manufactured by Google Inc. is installed on the PC 1. The Windows (registered trademark) Server OS manufactured by Microsoft Corporation is installed on each of the PC 2, the PC 147, and the PC 5, and the OS equivalent to Linux (registered trademark) is installed on the PC 7. The PC 1, the PC 2, the PC 5, the PC 147, and the PC 7 are connected not only to the network 4, 8, 10, and 6, respectively, configured with an interface (I/F) such as Ethernet (registered trademark) or the like but also to the Internet 12.

Each of multi function printers (hereinafter abbreviated as "MFP") 3 and 133 includes a color inkjet printer, a color facsimile, a color scanner, a flash memory external storage, and the like and is an example of a peripheral device (computer). Each of the MFPs 3 and 133 is an MFP with the model name of Kmmn manufactured by ABC company. Note that a peripheral device may be a device including a printer function, a copier function, a facsimile function, a scanner function, a digital camera function, and a complex function thereof.

The printer function of the MFPs 3 and 133 is realized by hardware as shown in the printer of FIG. 2. The MFP 3 is connected to a network 11 configured by Ethernet (registered trademark) and is also connected to the Internet 12. The MFP 133 is connected to a network 134 configured by Ethernet (registered trademark) and is also connected to the Internet 12.

A router 13 is a broad band router (Wi-Fi BB Router) or the like including Wi-Fi (registered trademark) wireless LAN and is connected to the Internet 12. Examples of a mobile device 14 include a cellular phone, a cellular information terminal, and the like. The mobile device 14 is connected to the router 13 and is also connected to the Internet 12 via the router 13. The PC 1, the PC 2, the PC 5, the PC 147, the PC 7, the mobile device 14, the MFP 3, and the MFP 133 can provide two-way communication via the Internet 12 (are communicably connected to each other). A Web browser 9 is installed on the PC 1, a Web browser 15 is installed on the mobile device 14.

An application 145 is an application for document creation using a Web service and is hereinafter referred to as "document creation APP 145". An application 146 is an application for providing a cloud printing service using a Web service and is hereinafter referred to as "cloud printing APP 146". The cloud printing APP 146 has a function equivalent to GCP provided by Google Inc. With the use of the cloud printing service, the document creation APP 145 is executed by the Web browser 9 in the PC 1 or the Web browser 15 in the mobile device and a document is opened so that the document can be printed by the MFP 3 or the MFP 133.

Figure 11:
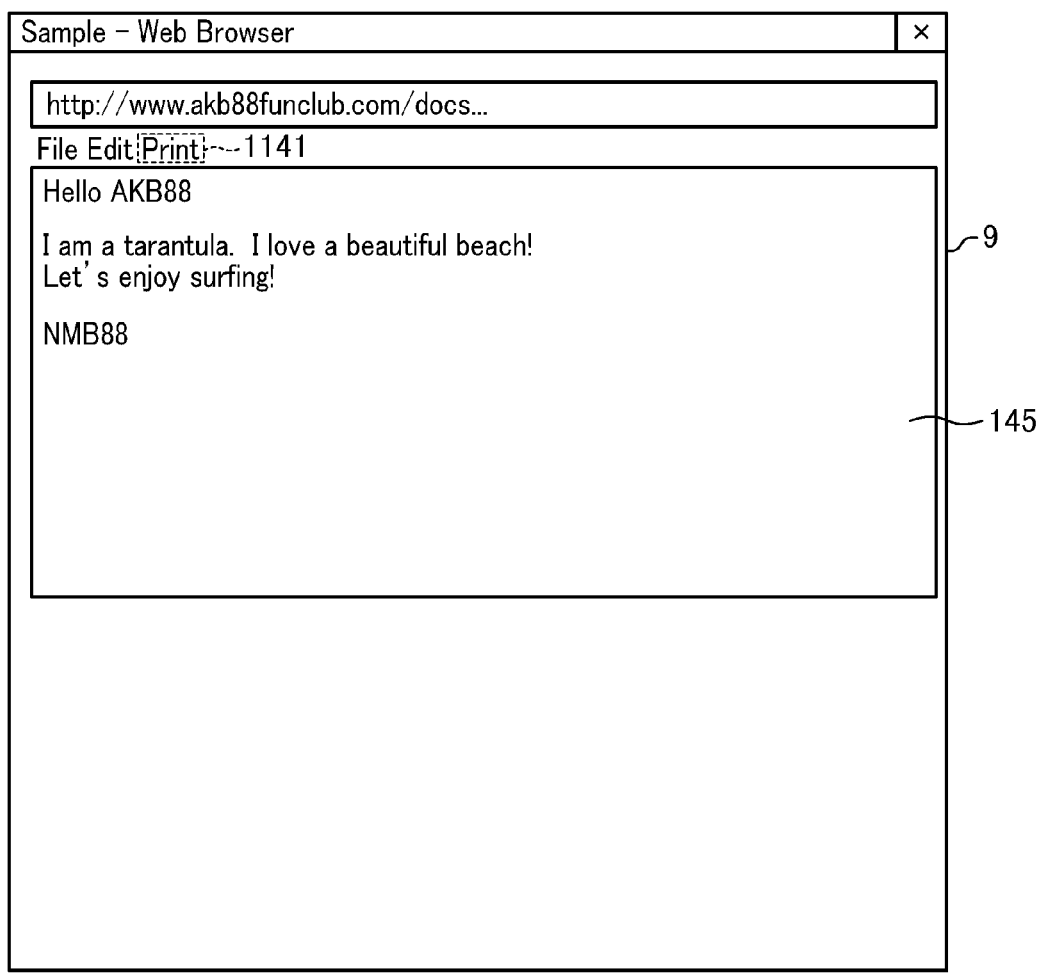
FIG. 11 is a diagram illustrating an example of a Web browser.
Figure 12:
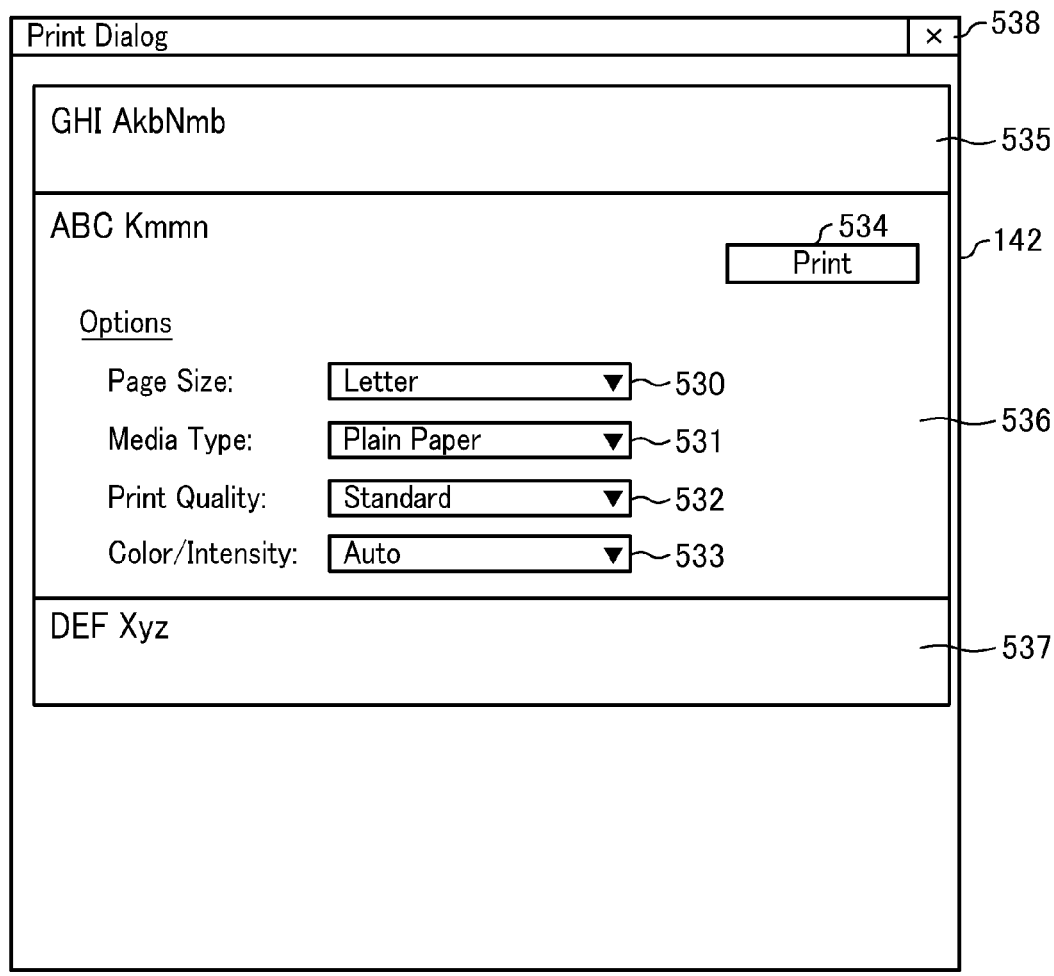
FIG. 12 is a diagram illustrating an example of a print dialogue.

For example, when a user selects a print menu 1141 shown in FIG. 11 to print an opened document, a print dialogue 142 shown in FIG. 12 is displayed by the cloud printing APP 146. When a user selects a printer using the print dialogue 142 and presses a print button 534 to provide a print execution instruction, the document creation APP 145 create a print image as a PDF file. Then, the cloud printing APP 146 creates a print job using the print image (PDF file) and the print setting value selected by the print dialogue 142, and stores the print job in a print queue for the selected printer in the cloud printing service. Also, the cloud printing APP 146 transmits a print job notification to the printer (in the example of the present embodiment to be described below, a proxy APP 143).

When printers or MFPs have a function for rendering a PDF file, the printers or the MFPs can print a print job stored in a print queue. However, many inexpensive inkjet printers or MFPs do not have a function for rendering a PDF file. Thus, when a print job stored in a print queue is printed by such a printer, a print image (PDF file) needs to be converted into an image format such as JPEG file or the like which can be rendered by an inexpensive printer (an example of pre-processing).

The application 143 is an application for providing a cloud printing proxy service that corresponds the MFPs 3 and 133 with the cloud printing service provided by the cloud printing APP 146. The application 143 is a relay service device that performs relay processing between the MFPs 3 and 133 and the cloud printing APP 146 and is hereinafter referred to as "proxy APP 143". The proxy APP 143 installed on the PC 2 is capable of managing 5,000 printers and MFPs at a time and is capable of corresponding each printer or each MFP with the cloud printing service provided by the cloud printing APP 146.

An application 144 is an application for providing an image conversion service that converts a PDF file into a JPEG file. The application 144 functions as an intermediate service device that communicates with the proxy APP 143 and performs relation processing relating to the cloud printing service and is hereinafter referred to as "image conversion APP 144".

An application 148 is an application for providing authentication service that performs user authentication upon utilization of the image conversion APP 144 by the proxy APP 143 and issues an access token for using the image conversion APP 144. The application 148 is hereinafter referred to as "authentication APP 148". The authentication APP 148 functions as an authentication service device and issues an access token for authentication upon utilization of the image conversion APP 144 by the proxy APP 143. If a cloud printing service 146 is, for example, GCP, such service is provided by different vendors. Thus, an authentication processing service provided by the authentication APP 148 is different from an authentication system or an authentication service used by the cloud printing APP 146. As described below, the cloud printing APP 146 issues an access token for authentication upon utilization of the cloud printing APP 146 by the image conversion APP 144. Note that an access token to be issued by the cloud printing APP 146 may also be issued by a cloud printing service provided by the cloud printing APP 146. The authentication APP 148 exports the following Web service API:

Log-in function
Log-out function
User registration function
User authentication function
Access token generation function
Access token validity confirmation function
Access token expiration date/time confirmation function The SSL-encrypted HTTPS POST method is used for these functions. A program related to these processes is embedded in the PC 147 and stored in the HDD 205 shown in FIG. 2 to be described below. The program is read into the RAM 203 and executed by the CPU 202.

Here, in order to use a cloud printing service provided by the cloud printing APP 146, a log-in is required using a user account and his/her password. When the cloud printing APP 146 registers the printers and MFPs usable for printing in a cloud printing service, the cloud printing APP 146 firstly acquires an access token, which is used upon utilization of cloud printing services, using the user account and his/her password. Then, the cloud printing APP 146 associates the user account with the printers and MFPs utilizing the acquired access token.

Upon registration of printers and MFPs, the cloud printing APP 146 issues a printer ID represented by a unique value and assigns the printer ID to each printer or each MFP to thereby notify a printer or the like targeted for registration of the printer ID. The detailed description of processing relating to registration of a printer or the like will be omitted.

Each of the PC 1, the PC 2, the PC 5, and the PC 7 includes hardware as shown in the print server, the authentication server, and the client terminal in FIG. 2. Programs such as the proxy APP 143, modules (software) shown in FIG. 10, or the like are stored in the HDD 205, read into the RAM 203, and executed by the CPU 202 as required. In this manner, the function of the proxy APP 143, the function of modules (software) shown in FIG. 10, and the like are realized. Also, various database (DB) is stored on the HDD 205 and database information is read into the RAM 203 by the CPU 202 as required. The printer function of the MFPs 3 and 133 is realized by hardware as shown in the printer of FIG. 2. A read unit, a facsimile control unit, and an external storage control unit constituting an MFP are not directly related with the present embodiment, and the description thereof will be omitted.

Figure 10:
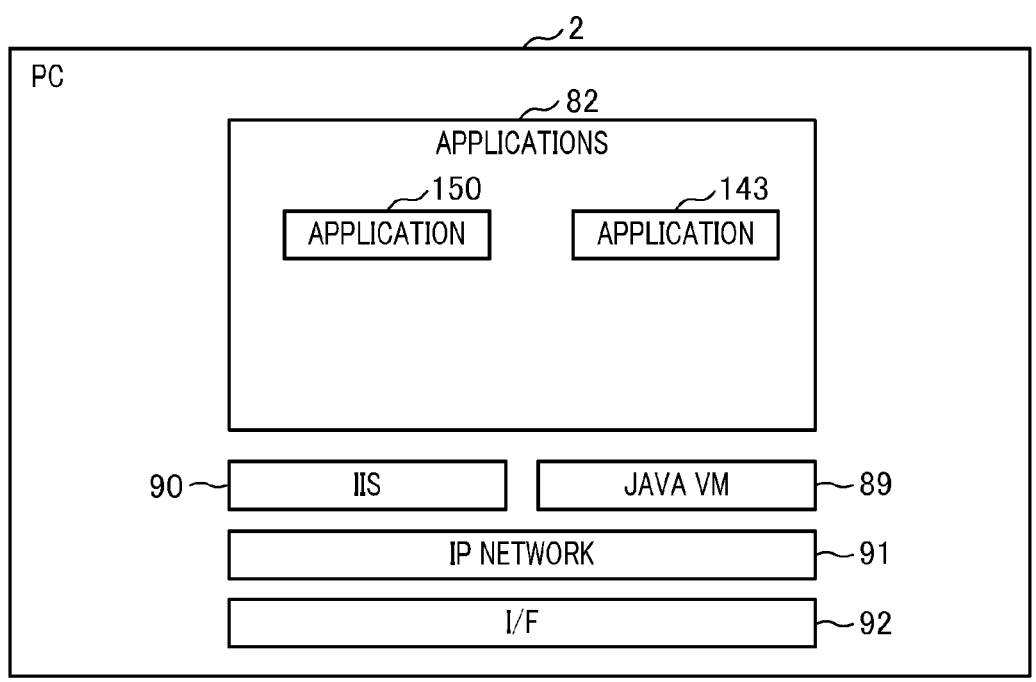
FIG. 10 is a diagram illustrating an example of the configuration of software installed on a PC.

FIG. 10 is a diagram illustrating an example of the configuration of software installed on a PC. In FIG. 10, a description will be given by taking the PC 2 as an example. An I/F 92 is an I/F control stack that controls I/F such as Ethernet (registered trademark) or the like. An IP Network 91 is an IP Network control stack that controls IP Network. An Internet Information Services (IIS) 90 is an IIS control unit that controls IIS. Application 150 provides a Web service utilizing the Web server function of the IIS control unit. JAVA (registered trademark) Virtual Machine (Java VM) 89 is software that converts Java byte code into platform native code for execution, and the proxy APP 143 is executed on the JAVA VM 89. Applications 82 are a group of applications and are constituted by the proxy APP 143, the application 150, and the like.

FIG. 11 is a diagram illustrating an example of the Web browser 9 provided by the document creation APP 145 on the PC 1. FIG. 11 shows a document in the opened state. The print menu 1141 accepts various operations relating to printing. For example, when a user operates an input unit such as a KBD 203 (user's operation) and presses down the print menu 1141 upon printing an opened document, the print dialogue 142 shown in FIG. 12 is displayed.

FIG. 12 is a diagram illustrating an example of the print dialogue 142. The print dialogue 142 is controlled by the cloud printing APP 146 as a print setting screen for the MFPs 3 and 133 used by a user. Also, the print dialogue 142 uses the Web browsers 9 and 15 and is displayed on the Web browsers.

Each of printer options 535, 536, and 537 is the option of selectable printer. The printer options 535, 536, and 537 represent options corresponding to a printer with the model name of AkbNmb manufactured by GHI company, an MFP (MFP 3) with the model name of Kmmn manufactured by ABC company, and a printer with the model name of Xyz manufactured by DEF company, respectively. FIG. 12 shows the state in which the printer option 536 representing the MFP 3 is selected.

In a paper size selection unit 530, the size of the paper to be printed by the MFP 3 is selected from the following options in response to the user's operation. FIG. 12 shows the state in which the paper size "Letter" is selected.

Paper Size Options: A5, A4, B5, Letter

In a media type selection unit 531, the type of media to be printed by the MFP 3 is selected from the following options in response to the user's operation. FIG. 12 shows the state in which the media size "Plain Paper" is selected.

Media Type Options: Plain Paper, Photo Paper, Postcard

In a print quality selection unit 532, the print quality of paper to be printed by the MFP 3 is selected from the following options in response to the user's operation. FIG. 12 shows the state in which the print quality "Standard" is selected.

Print Quality Options: High, Standard, Fast

In a color/intensity selection unit 533, the color/intensity of paper to be printed by the MFP 3 is selected from the following options in response to the user's operation. FIG. 12 shows the state in which the color/intensity "Auto" is selected.

Color/Intensity Options: Auto, Manual

The print button 534 accepts a print start instruction. When the print button 534 is pressed down by the user's operation, the cloud printing APP 146 creates a print job for the MFP 3 associated with the printer option 536. A close button 538 accepts an instruction for closing the print dialogue 142. When the close button 538 is pressed down by the user's operation, the cloud printing APP 146 closes the print dialogue 142.

Figure 13:
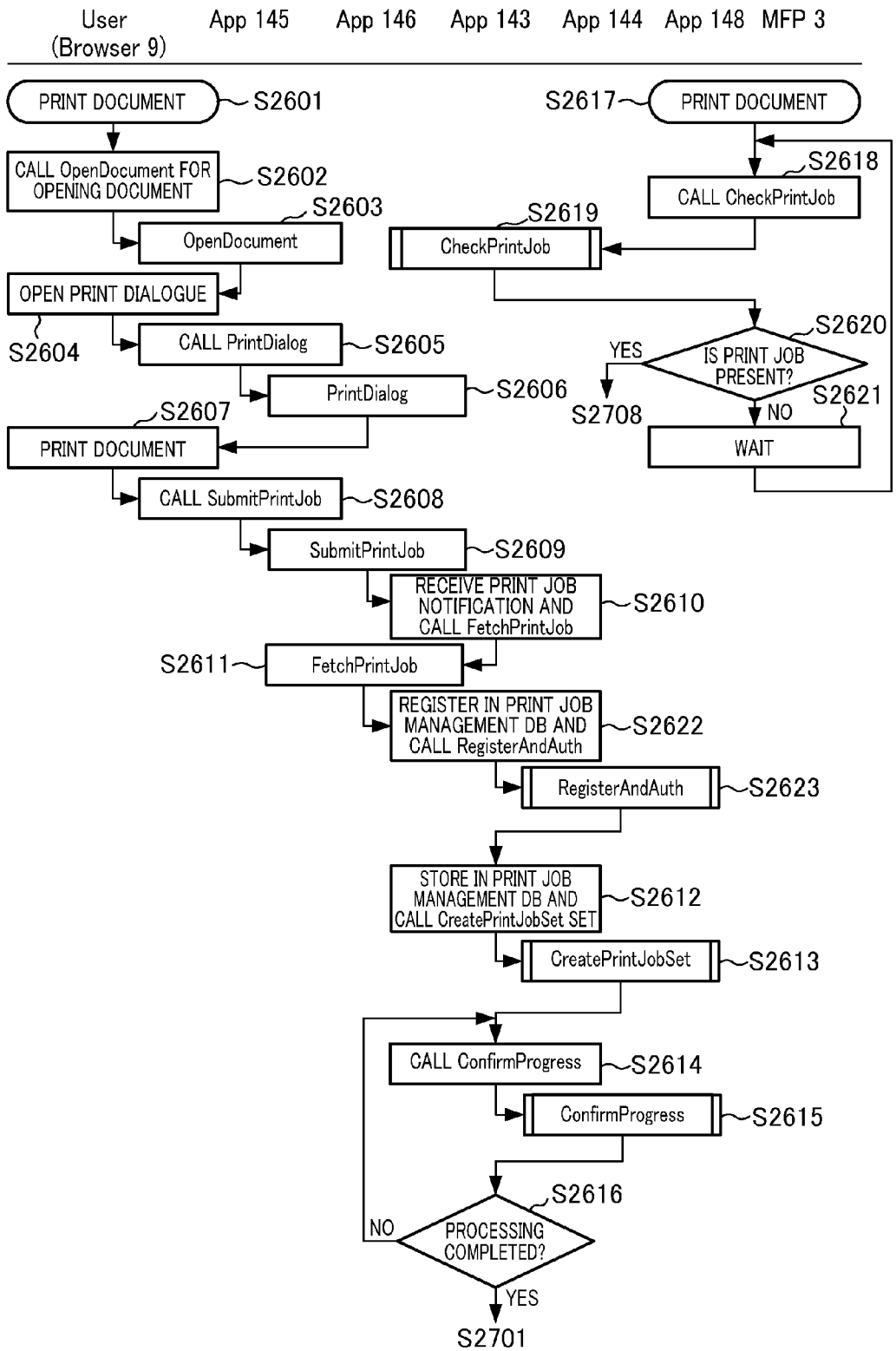
FIG. 13 is a diagram illustrating an example of the flowchart of the overall processing performed by an information processing system.
Figure 14:
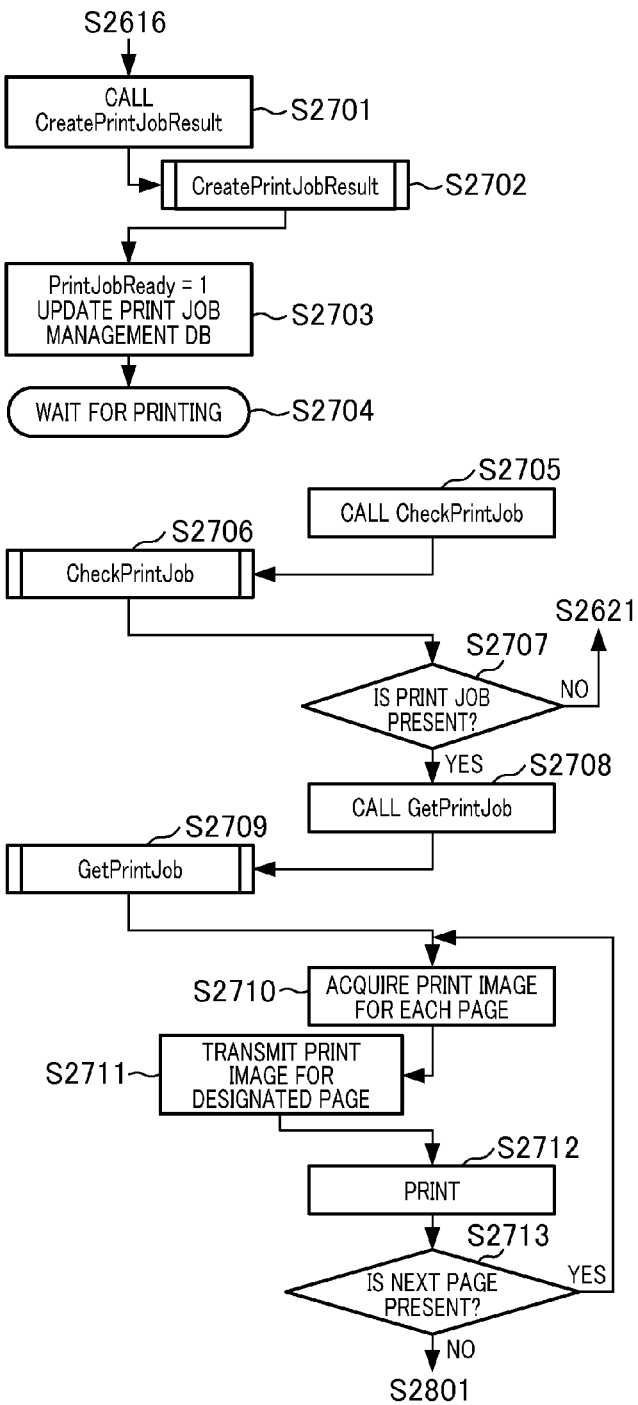
FIG. 14 is a diagram illustrating an example of the flowchart of the overall processing performed by an information processing system.
Figure 15:
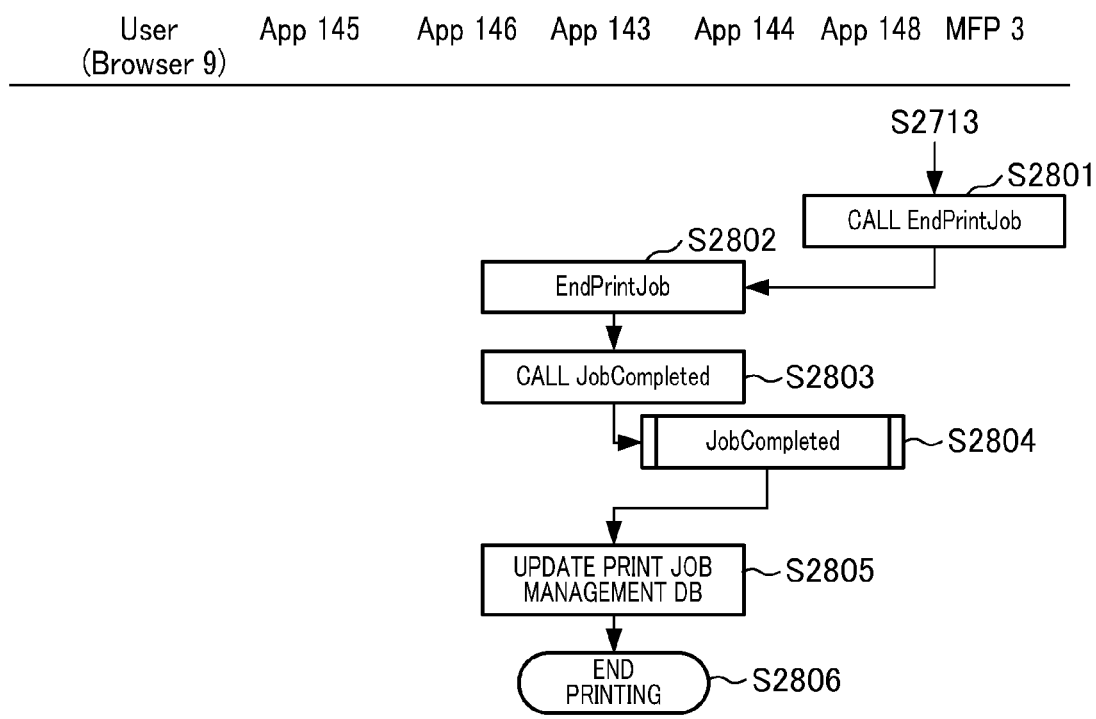
FIG. 15 is a diagram illustrating an example of the flowchart of the overall processing performed by an information processing system.

FIG. 13, FIG. 14, and FIG. 15 are diagrams illustrating an example of the flowchart of processing performed by the overall information processing system. A program relating to these flowcharts is embedded in a PC or an MFP. The application program running on a PC is stored in the HDD 205, read into the RAM 203, and executed by the CPU 202. The application program running on an MFP is stored in a ROM 16, read into a RAM 17, and executed by a CPU 25.

In these flowcharts, longitudinal columns represent processing execution sources. In the present embodiment, a user (the Web browser 9), the document creation APP 145, the cloud printing APP 146, the proxy APP 143, the image conversion APP 144, the authentication service APP 148, and the MFP 3 are shown from the left of FIG. 13, FIG. 14, and FIG. 15. A description will be given below of a communication control method by taking an example of a case in which the MFP 3 performs document printing using the PC 1 by a user (a series of processing relating to document printing).

Firstly, a description will be given of processing for polling a print job by the MFP 3 with reference to steps S2617 to S2621. In FIG. 13, step S2617 is a step that represents the start of document printing as viewed from the MFP 3 side for convenience sake. Note that the step is intended to simply represent the start of the flowchart without imparting any effect to the execution of processing in the MFP 3.

In step S2618, the MFP 3 calls the CheckPrintJob function of a Web service API being exported by the proxy APP 143. When the MFP 3 calls the function in step S2618, the MFP 3 transfers the following information (an example of confirmation information) to the proxy APP 143 as query parameters for an HTTP GET request:

Printer ID issued from the cloud printing APP 146
Random code

Also, the timing of calling the CheckPrintJob function is arbitrary and a polling operation in which a call is made at periodic intervals is performed. However, the present invention is not limited thereto. For example, a call may also be made upon designation from a user. Furthermore, confirmation information included in query parameters is also not limited to printer ID and random code. Random code is any 32-bit value generated by the MFP 3. When the CheckPrintJob function is called, the proxy APP 143 executes processing of the CheckPrintJob function (to be described below) shown in FIG. 16A and sends the response (an example of response information) back to the MFP 3 (step S2619).

Next, upon receiving the response of the CheckPrintJob function from the proxy APP 143, the MFP 3 confirms information ("print job present response" or "print job absent response") included in the response message in the response (step S2620). When the MFP 3 determines in step S2620 that the "print job present response" has been received, the process shifts to step S2708 shown in FIG. 14, whereas when the MFP 3 determines in step S2620 that the "print job absent response" has been received, the process shifts to step S2621.

In step S2621, the MFP 3 waits for a predetermined time (in the present embodiment, 1 minute), and the process shifts to step S2618. As described above, the MFP 3 polls the CheckPrintJob function being exported by the proxy APP 143 at predetermined time intervals (regular intervals).

Next, a description will be given of document print processing. Here, step S2601 is a step that represents the start of document printing as viewed from the user side for convenience sake. Note that the step is intended to simply represent the start of the flowchart without imparting any effect to the execution of user's operation or application.

Firstly, a user activates the Web browser 9 and accesses and logs in the URL of the document creation APP 145. When the user designates a document and provides an instruction for opening the document, the Web browser 9 calls the OpenDocument function of the Web service API being exported by the document creation APP 145 using the document as an input parameter (step S2602).

When the OpenDocument function is called, the document creation APP 145 opens the document designated by the input parameter and transmits the document information to the Web browser 9 (step S2603). For example, as shown in FIG. 11, the document is in an opened state via the document creation APP 145 on the Web browser 9. When the print menu 1141 is pressed down by the user's operation to print the document, the document creation APP 145 is notified of the information via the Web browser 9 (step S2604). Upon receiving the notification, the document creation APP 145 calls the PrintDialog function of the Web service API being exported by the cloud printing APP 146 (step S2605).

When the PrintDialog function is called, the cloud printing APP 146 opens the print dialogue 142 and transmits the information to the Web browser 9 (step S2606). For example, as shown in FIG. 12, the print dialogue 142 is displayed on the Web browser 9.

By operating the input unit, a user selects a printer (in the example shown in FIG. 12, the printer option 536 associated with the MFP 3) for printing from a plurality of printer options, selects a desired set value from print setting values, and presses down the print button 534. When the print button 534 is pressed down, the document creation APP 145 is notified of information indicating the print start request from the user and information relating to the print setting value via the Web browser 9 (step S2607).

Information relating to the print setting value is URL in which a print setting file (XML file) describing the print setting value selected by a user is stored. Upon receiving the notification, the document creation APP 145 creates a print image as a PDF file. Then, the document creation APP 145 calls the SubmitPrintJob function of the Web service API being exported by the cloud printing APP 146 using the created PDF file, information relating to the print setting value, and the like as input parameters (step S2608).

When the SubmitPrintJob function is called, the cloud printing APP 146 creates a print job based on the PDF file designated by the input parameters, information relating to the print setting value, and the like. Then, the cloud printing APP 146 transmits a print job notification to a printer (in the present example, the proxy APP 143 because image format conversion is necessary for the MFP 3) associated with the selected printer option (step S2609).

Also, a print job includes at least the following information (hereinafter referred to as "print job information").

Print job ID issued by the cloud printing APP 146
Printer ID issued by the cloud printing APP 146
Access token for utilization of a cloud printing service
URL in which a print setting file (XML file) describing a print setting value is stored
URL of the storage destination of the print image (PDF file)
Time stamp Upon receiving the print job notification, the proxy APP 143 calls the FetchPrintJob function of the Web service API being exported by the cloud printing APP 146 (step S2610). When the FetchPrintJob function is called, the cloud printing APP 146 transmits information (print job information) included in the print job created in step S2609 to the proxy APP 143 (step S2611).

Upon receiving print job information, the proxy APP 143 acquires the necessary information from print job information, and stores the acquired information and information required for other control in a print job management database (step S2622). Then, the proxy APP 143 calls the RegisterAndAuth function of the Web service API being exported by the image conversion APP 144 (step S2622).

When the proxy APP 143 calls the function in step S2622, the proxy APP 143 transfers the following information (an example of pre-processing information) to the image conversion APP 144 as input parameters for the HTTPS POST request:

Administrator ID utilizing the authentication APP 148
Administrator password utilizing the authentication APP 148
User ID utilizing the image conversion APP 144
User password utilizing the image conversion APP 144
Service ID
Printer ID issued by the cloud printing APP 146
Print job ID issued by the cloud printing APP 146
Access token for utilization of the image conversion APP 144

Here, the service ID represents an ID for specifying each cloud printing service. For example, the following IDs can be designated. Note that parentheses ( ) represent the summary of each cloud printing service.

GCP Consumer (GCP for consumer)
GCP Enterprise (GCP for enterprise)
Email Print Consumer (Email printing for consumer)
Email Print Enterprise (Email printing for enterprise)
ABC Cloud Print (cloud printing provided by ABC company)

Information "administrator ID utilizing the authentication APP 148" is identification information about the proxy APP 143 and is registered in the proxy APP 143 in advance. Information "administrator password utilizing the authentication APP 148" is a password for authenticating the proxy APP 143 ID and is registered in the proxy APP 143 in advance. Information "user ID utilizing the image conversion APP 144" is identification information uniquely assigned to each MFP managed by the proxy APP 143. Information "user password utilizing the image conversion APP 144" is a password for authenticating the user ID. Information "user ID utilizing the image conversion APP 144" and "user password utilizing the image conversion APP 144" is automatically created by the proxy APP 143.

In step S2622, the proxy APP 143 loads an access token for utilization of the image conversion APP 144 and sets the access token to "access token for utilization of the image conversion APP 144". The access token for utilization of the image conversion APP 144 has previously been transferred to the print job management database as the response of the RegisterAndAuth function for MFP and stored therein. For example, when initial printing is performed by an MFP, no access token for utilization of the image conversion APP 144 is stored in the print job management database. Thus, upon calling the RegisterAndAuth function, the proxy APP 143 sets no value to "access token for utilization of the image conversion APP 144" to be transferred as the input parameter of the HTTPS POST request. For example, when the second and subsequent printing is performed by the MFP, the proxy APP 143 loads the access token for utilization of the image conversion APP 144, which has been used for the previous printing by the MFP, from the print job management database. Then, the proxy APP 143 sets the access token for utilization of the image conversion APP 144 as the input parameter of the HTTPS POST request to be made upon calling the RegisterAndAuth function.

When the RegisterAndAuth function is called, the image conversion APP 144 executes processing of the RegisterAndAuth function to be described below with reference to FIG. 21, and sends the response back to the proxy APP 143 (step S2623). The response includes the access token for utilization of the image conversion APP 144 issued by the authentication APP 148. In other words, at this time, the CPU 202 for the image conversion APP 144 functions as an acquisition unit that acquires an access token by transmitting an authentication request to the authentication APP 148 upon accepting the authentication request from the proxy APP 143.

Upon receiving the response of the RegisterAndAuth function from the image conversion APP 144, the proxy APP 143 stores the access token for utilization of the image conversion APP 144 included in the response in the print job management database. Next, the proxy APP 143 calls the CreatePrintJobSet function of the Web service API being exported by the image conversion APP 144 (step S2612). When the proxy APP 143 calls the function in step S2612, the proxy APP 143 transfers the following information (an example of pre-processing information) to the image conversion APP 144 as input parameters for the HTTPS POST request:

Service ID
Printer ID issued by the cloud printing APP 146
Print job ID issued by the cloud printing APP 146
Access token for utilization of the image conversion APP 144
Access token for utilization of a cloud printing service
URL of the storage destination of the print image (PDF file)

In step S2622, the print job management database stores the following information:

[Print Job Management Database]
Search key: print job ID issued by the cloud printing APP 146
Service ID
Printer ID issued by the cloud printing APP 146
Access token for utilization of the image conversion APP 144
Access token for utilization of a cloud printing service
URL of the storage destination of the print setting file (XML file)
URL of the storage destination of the print image (PDF file)
Access token to the image conversion APP 144
Print job access URL (URL of the storage destination of a JPEG file)
The total number of pages in a print image (JPEG file)
Print job preparation completion (PrintJobReady) (0: Incomplete, 1: Complete)

At this time, the proxy APP 143 sets "0" to PrintJobReady as the initial value representing that the print job preparation is not completed. Also, the proxy APP 143 sets the initial value "0" to the total number of pages in a print image (JPEG file).

When the CreatePrintJobSet function is called, the image conversion APP 144 executes processing of the CreatePrintJobSet function to be described below with reference to FIG. 17A, and sends the response back to the proxy APP 143 (step S2613). The response includes the session ID issued by the image conversion APP 144.

Upon receiving the response of the CreatePrintJobSet function from the image conversion APP 144, the proxy APP 143 calls the ConfirmProgress function of the Web service API being exported by the image conversion APP 144 (step S2614). When the proxy APP 143 calls the function in step S2614, the proxy APP 143 transfers the following information (an example of confirmation information) to the image conversion APP 144 as query parameters for the HTTP GET request:

Session ID
Sequence

The session ID is information included in the response of the CreatePrintJobSet function, and the sequence is any number created by the proxy APP 143. When the ConfirmProgress function is called, the image conversion APP 144 executes processing of the ConfirmProgress function to be described below with reference to FIG. 18A, and sends the response (an example of response information) back to the proxy APP 143 (step S2615).

The proxy APP 143 receives the response of the ConfirmProgress function from the image conversion APP 144. Then, the proxy APP 143 confirms the content ("processing response", "processing completion response", or "error response") included in the response message in the response (step S2616). When it is determined in step S2616 that the proxy APP 143 has received "processing completion response", the process shifts to step S2701 shown in FIG. 14, whereas when it is determined in step S2616 that the proxy APP 143 has received "processing response", the process shifts to step S2614.

When an error occurs during download/image conversion thread processing for the image conversion APP 144 to be described below with reference to FIG. 17B, the proxy APP 143 receives "error response" in step S2616, and print processing is error ended. However, it is not essential to the present embodiment that print processing is error ended, and thus, the detailed description will be omitted. Thus, in the step subsequent to step S2616, a description will be given focusing on a case in which the proxy APP 143 has received "processing completion response" or "processing response".

As shown in FIG. 14, in step S2701, the proxy APP 143 calls the CreatePrintJobResult function of the Web service API being exported by the image conversion APP 144. When the proxy APP 143 calls the function in step S2701, the proxy APP 143 transfers the following information (an example of location acquisition information) to the image conversion APP 144 as input parameters for the HTTPS POST request:

Printer ID issued by the cloud printing APP 146
Print job ID issued by the cloud printing APP 146

When the CreatePrintJobResult function is called, the image conversion APP 144 executes processing of the CreatePrintJobResult function to be described below with reference to FIG. 19, and sends the response back to the proxy APP 143 (step S2702).

Upon receiving the response of the CreatePrintJobResult function from the image conversion APP 144, the proxy APP 143 sets "1" to PrintJobReady (step S2703). Then, the proxy APP 143 sets "1" representing print job preparation completion to print job preparation completion (PrintJobReady) in the print job management database (step S2703). In this manner, the MFP 3 is in a print wait state (step S2704).

As described in steps S2618 to S2621 shown in FIG. 13, the MFP 3 polls the CheckPrintJob function being exported by the proxy APP 143 at predetermined time intervals. The process in step S2705 is equivalent to that in step S2618. A description will be given of a case in which the MFP 3 calls the CheckPrintJob function being exported by the proxy APP 143 in step S2705 when the MFP 3 is in a print wait state in step S2704. When the CheckPrintJob function is called, the proxy APP 143 executes processing of the CheckPrintJob function to be described below with reference to FIG. 16A, and sends the response back to the MFP 3 (step S2706).

Upon receiving the response of the CheckPrintJob function from the proxy APP 143, the MFP 3 confirms the content ("print job present response" or "print job absent response") included in the response message in the response (step S2707). When it is determined in step S2707 that the MFP 3 has received the "print job present response", the process shifts to step S2708, whereas when it is determined in step S2707 that the MFP 3 has received the "print job absent response", the process shifts to step S2621.

In step S2708, the MFP 3 calls the GetPrintJob function of the Web service API being exported by the proxy APP 143. When the MFP 3 calls the function in step S2708, the MFP 3 transfers the following information (an example of acquisition information) to the proxy APP 143 as a query parameter of the HTTPS GET request:

Printer ID issued by the cloud printing APP 146

When the GetPrintJob function is called, the proxy APP 143 executes processing of the GetPrintJob function to be described below with reference to FIG. 16B, and sends the response back to the MFP 3 (step S2709). Upon receiving the response of the GetPrintJob function from the proxy APP 143, the MFP 3 transmits a print image acquisition request to the image conversion APP 144 based on the content included in the response message of the response (step S2710).

Here, the content included in the response message of the response is a print job access URL (URL of the storage destination of a print image (JPEG file)), the total number of pages in a print image (JPEG file), and an access token for the image conversion APP 144. Also, the print image acquisition request is a request for acquiring a print image (JPEG file) of each page from the image conversion APP 144.

In the present embodiment, the print job access URL is the storage destination URL of the PC 5 having the image conversion App 144, but may also be the storage destination URL of another PC. For example, the print job access URL may be transmitted directly from the PC 5. For example, the PC 2 having the App 143 may acquire a print image of the designated page from the PC 5 and transmit the acquired print image to the MFP 3. For example, the PC 2 may transmit the URL of the storage destination of the acquired print image to the MFP 3.

Upon receiving the print image acquisition request from the MFP 3, the image conversion APP 144 allows access to a print image (JPEG file) of the designated page from the MFP 3, and transmits the print image to the MFP 3 (step S2711). Upon receiving the print image transmitted from the image conversion APP 144, the MFP 3 prints the print image (step S2712). Next, the MFP 3 confirms the presence/absence of the next page based on the total number of pages of the print image (JPEG file) (step S2713). At this time, when the MFP 3 determines that the next page is present, the process shifts to step S2710, and the MFP 3 transmits a print image acquisition request for acquiring a print image of the next page to the image conversion APP 144. On the other hand, when the MFP 3 determines that the next page is absent, the process shifts to step S2801 shown in FIG. 15.

The SSL-encrypted HTTPS GET method is utilized for acquisition processing for acquiring a print image (JPEG file) in steps S2710 to S2712.

As shown in FIG. 15, in step S2801, the MFP 3 calls the EndPrintJob function of the Web service API being exported by the proxy APP 143. The SSL-encrypted HTTPS GET method is utilized for calling the EndPrintJob function. When the MFP 3 calls the function in step S2801, the MFP 3 transfers the following information (an example of end information) to the proxy APP 143 as query parameters for the HTTPS GET request:

Printer ID issued by the cloud printing APP 146
Print job ID issued by the cloud printing APP 146

When the EndPrintJob function is called (step S2802), the proxy APP 143 calls the JobCompleted function of the Web service API being exported by the image conversion APP 144 (step S2803). When the proxy APP 143 calls the function in step S2803, the proxy APP 143 transfers the following information (an example of job processing end information) to the image conversion APP 144 as input parameters for the HTTPS POST request:

Printer ID issued by the cloud printing APP 146
Print job ID issued by the cloud printing APP 146

When the JobCompleted function is called, the image conversion APP 144 executes processing of the JobCompleted function to be described below with reference to FIG. 18B, and sends the response back to the proxy APP 143 (step S2804). Upon receiving the response of the JobCompleted function from the image conversion APP 144, the proxy APP 143 deletes information relating to the print job from the print job management database, and updates the print job management database (step S2805). Then, the proxy APP 143 ends document print processing (step S2806).

Figure 16A:
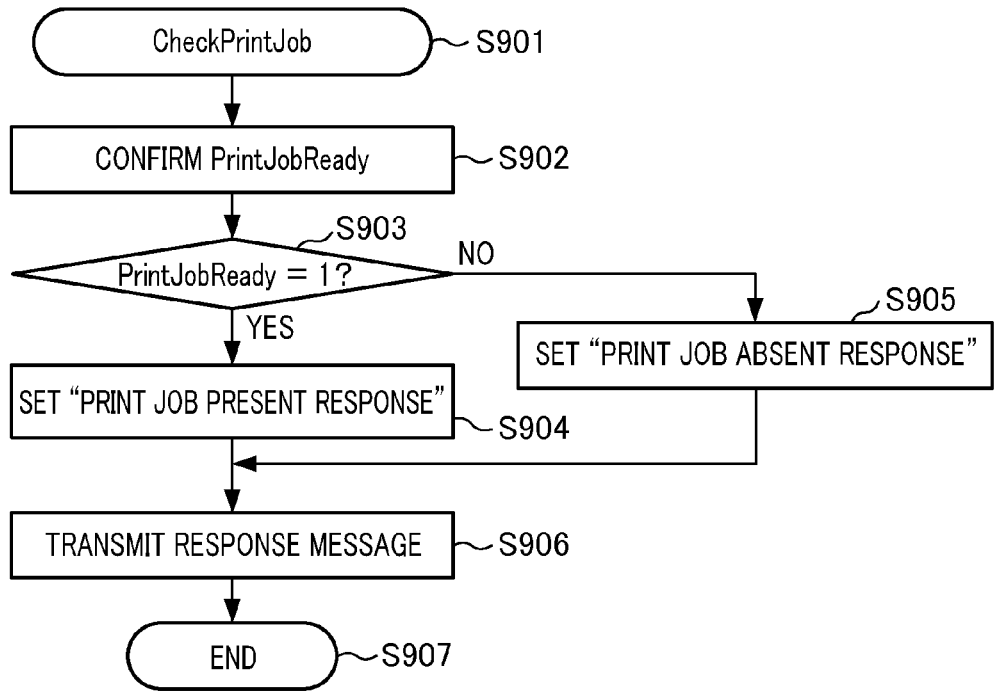
FIGS. 16A and 16B are diagrams illustrating an example of the flowchart of processing performed by a proxy APP.

Next, a description will be given of processing for the Web service API to be exported by the proxy APP 143 with reference to FIGS. 16A and 16B. FIG. 16A is a diagram illustrating an example of the flowchart of processing of the CheckPrintJob function. FIG. 16B is a diagram illustrating an example of the flowchart of processing of the GetPrintJob function. The HTTP GET method is utilized for the CheckPrintJob function. The SSL-encrypted HTTPS GET method is utilized for the GetPrintJob function. A program relating to these flowcharts is embedded in the PC 2, stored in the HDD 205, read into the RAM 203, and executed by the CPU 202.

When the MFP 3 calls the CheckPrintJob function in step S2618 shown in FIG. 13 and in step S2705 shown in FIG. 14, the proxy APP 143 executes processing of the CheckPrintJob function shown in FIG. 16A. As shown in FIG. 16A, when processing of the CheckPrintJob function is started (step S901), the proxy APP 143 confirms print job preparation completion (PrintJobReady) in the print job management database (step S902). In step S901, the printer ID issued by the cloud printing APP 146 and the random code are transferred from the MFP 3 as query parameters for the HTTP GET request.

When the proxy APP 143 determines that "1" representing that a print job preparation is completed is set to print job preparation completion (PrintJobReady), that is, a print job for the MFP 3 is present (YES in step S903), the process shifts to step S904. On the other hand, when the proxy APP 143 determines that "0" representing that a print job preparation is not completed is set, that is, a print job for the MFP 3 is absent (NO in step S903), the process shifts to step S905.

In step S904, the proxy APP 143 sets the "print job present response" to the response message to be included in the BODY of the response to the HTTP GET request, and the process shifts to step S906. In step S905, the proxy APP 143 sets the "print job absent response" to the response message to be included in the BODY of the response to the HTTP GET request, and the process shifts to step S906. In step S906, the proxy APP 143 transmits the response message to the issuance source (in the present example, the MFP 3) of the GET request, and ends processing of the CheckPrintJob function (step S907).

Here, a detailed description will be given of the "print job present response" and the "print job absent response". Information representing the state in which a print job is present and information representing the state in which a print job is absent are "10101010" and "01010101", respectively. Each of the "print job present response" and the "print job absent response" is the result of computation using a random code and information representing the state, and is constituted by, for example, character string information in which the following information is converted into a character string:

"Print job present response"=random code XOR 10101010

"Print job absent response"=random code XOR 01010101

As described above, generally incomprehensible character string information instead of visible information defined by XML or the like is used for the response to the HTTP GET request. In this manner, a malfunction or a fraudulent control caused by an unauthorized access to the Web service API may be prevented. The configuration for preventing such an unauthorized access is not limited to this example. More complex computation such as hashing or the like may also be combined.

Figure 16B:
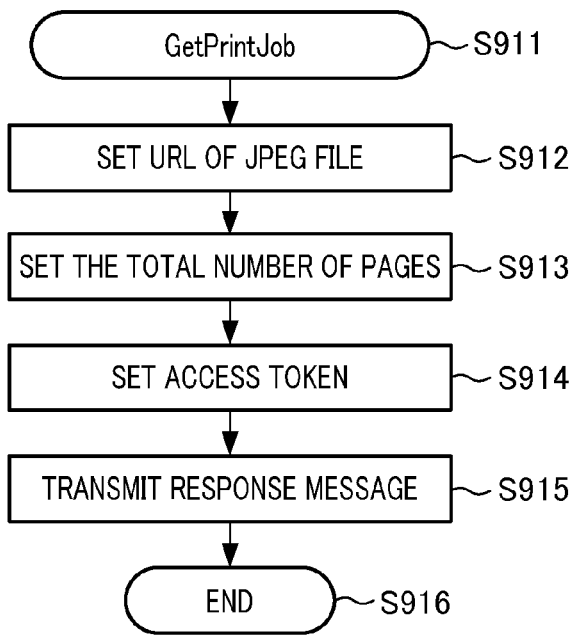

Also, when the MFP 3 calls the GetPrintJob function in step S2708 shown in FIG. 14, the proxy APP 143 executes processing of the GetPrintJob function shown in FIG. 16B. As shown in FIG. 16B, the proxy APP 143 starts processing of the GetPrintJob function (step S911). Then, the proxy APP 143 sets the storage destination URL of a print image (JPEG file) to the response message to be included in the BODY of the response to the HTTPS GET request (step S912), and the process shifts to step S913.

In step S913, the proxy APP 143 sets the total number of pages in the print image (JPEG file) to the response message to be included in the BODY of the response to the HTTPS GET request, and the process shifts to step S914. In step S914, the proxy APP 143 sets an access token for the image conversion APP 144 to the response message to be included in the BODY of the response to the HTTPS GET request, and the process shifts to step S915. In step S915, the proxy APP 143 transmits the response message to the issuance source (in the present example, the MFP 3) of the GET request, and ends processing of the GetPrintJob function (step S916).

Next, a description will be given of processing for the Web service API to be exported by the image conversion APP 144 and processing of thread function with reference to FIGS. 17A and 17B. FIG. 17A is a diagram illustrating an example of the flowchart of processing of the CreatePrintJobSet function. FIG. 17B is a diagram illustrating an example of the flowchart of processing of the download/image conversion thread function. The SSL-encrypted HTTPS POST method is utilized for the CreatePrintJobSet function.

A program relating to these flowcharts is embedded in the PC 5, stored in the HDD 205, read into the RAM 203, and executed by the CPU 202.

Figure 17A:
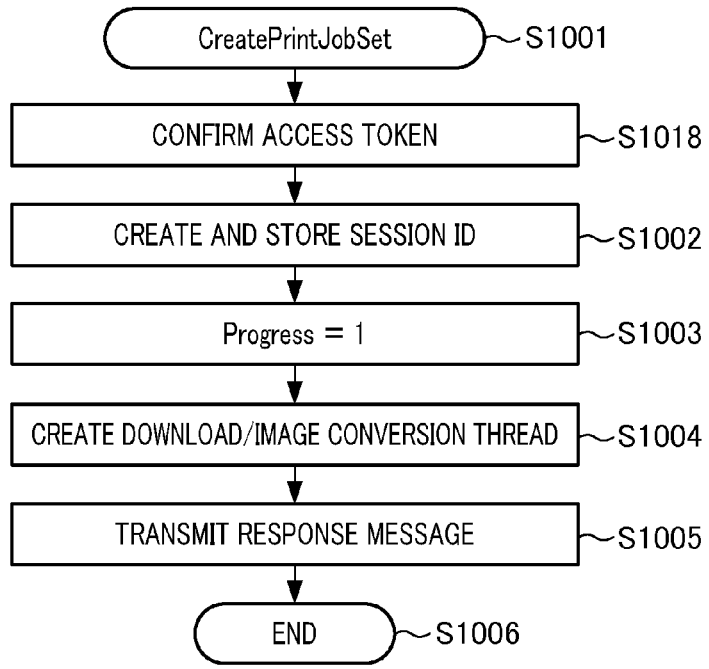
FIGS. 17A and 17B are diagrams illustrating an example of the flowchart of processing performed by an image conversion APP.

When the proxy APP 143 calls the CreatePrintJobSet function in step S2612 shown in FIG. 13, the image conversion APP 144 executes processing of the CreatePrintJobSet function shown in FIG. 17A.

As shown in FIG. 17A, the image conversion APP 144 starts processing of the CreatePrintJobSet function (step S1001), and access token confirmation processing to be described below with reference to FIG. 22 (step S1018). At this time, the following information is passed as arguments of the processing (subroutine function):

Service ID
Printer ID issued by the cloud printing APP 146
Print job ID issued by the cloud printing APP 146

Access token for utilization of the image conversion APP 144

Then, the image conversion APP 144 generates a session ID and stores the session ID in the session management database (step S1002), and the process shifts to step S1003. The session management database stores the following information:

[Session Management Database]
Search key: Session ID issued by the image conversion APP 144
Service ID
Printer ID issued by the cloud printing APP 146
Print job ID issued by the cloud printing APP 146
Access token for utilization of a cloud printing service
URL of the storage destination of the print image (PDF file)
Access token for utilization of the image conversion APP 144
Print job access URL (URL of the storage destination of a JPEG file)
Progress state representing the progress of processing (Progress)

Here, the image conversion APP 144 acquires the Printer ID and the print job ID issued by the cloud printing APP 146 among the input parameters of the CreatePrintJobSet function. Then, the image conversion APP 144 stores the printer ID and the print job ID issued by the cloud printing APP 146 in the session management database. Also, the image conversion APP 144 acquires an access token for utilization of a cloud printing service among the input parameters of the CreatePrintJobSet function. Then, the image conversion APP 144 stores the access token for utilization of a cloud printing service in the session management database. Furthermore, the image conversion APP 144 acquires URL of the storage destination of the print image (PDF file) among the input parameters of the CreatePrintJobSet function, and stores URL of the storage destination of the print image (PDF file) in the session management database.

Next, the image conversion APP 144 sets "1" representing processing to progress state (Progress) representing the progress of processing in the session management database (step S1003), and the process shifts to step S1004. In step S1004, the image conversion APP 144 creates a download/image conversion thread, and the process shifts to step S1005. Download/image conversion thread processing will be described below with reference to FIG. 17B.

Next, the image conversion APP 144 sets "SUCCESS" representing the fact that the function has been successful and thus has been normally ended and the session ID created in step S1002 to the response message to be included in the BODY of the response to the HTTP POST request (step S1005). Then, the image conversion APP 144 transmits the response message to the issuance source (in the present example, the proxy APP 143) of the POST request (step S1005). Then, the image conversion APP 144 ends processing of the CreatePrintJobSet function (step S1006).

Also, when the image conversion APP 144 creates a download/image conversion thread in step S1004, a thread different from the CreatePrintJobSet function is activated. Then, download/image conversion thread processing shown in FIG. 17B is executed in the thread.

Figure 17B:
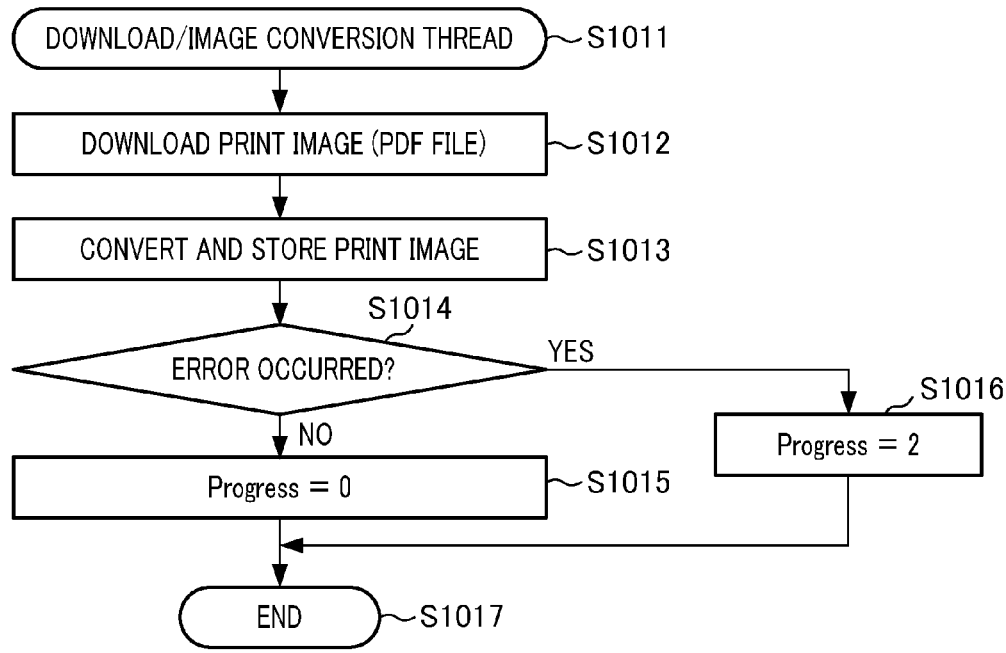

As shown in FIG. 17B, the image conversion APP 144 starts download/image conversion thread processing (step S1011). Then, the image conversion APP 144 accesses URL of the storage destination of the print image (PDF file) by means of the SSL-encrypted HTTPS GET method utilizing the access token for utilization of a cloud printing service. In other words, the image conversion APP 144 downloads the print image (PDF file) from a cloud printing service, and temporarily stores the downloaded print image (PDF file) in the RAM 203 (step S1012).

After completion of downloading, the image conversion APP 144 converts the print image (PDF file) into a JPEG file in a format printable by the MFP 3. The HDD 205 of the PC 5 stores setting information indicating a printable format for each printer or each MFP in advance. Then, the image conversion APP 144 stores the JPEG file in a folder composed of the printer ID and the print job ID issued by the cloud printing APP 146 (step S1013).

Also, in step S1013, the image conversion APP 144 sets an access token for the image conversion APP 144 to an access token for the image conversion APP 144 in the session management database. The access token for the image conversion APP 144 is an access token for accessing the print image (JPEG file) by a printer or an MFP (in the present example, the MFP 3) associated with the printer ID issued by the cloud printing APP 146. Furthermore, in step S1013, the image conversion APP 144 sets URL of the storage destination of the print image (JPEG file) (first page) to the print job access URL in the session management database.

Example

Printer ID: abcde
Print job ID: 1234
Total number of pages in the print image (JPEG file): 3 pages
Data storage in the PC 2:
C:\abcde1234\
p1.jpg
p2.jpg
p3.jpg
URL:http://www.abc.xxx/printdata/
?pi=abcde&ji=1234&p=1

The URL represents the JPEG file of the first page (p1.jpg). Thus, upon acquiring a print image for each page, the MFP 3 assigns the page number to be acquired to the query parameter "p" representing a page number. In step S1013, the image conversion APP 144 converts the print image (PDF file) into the print image (JPEG file). When the conversion has been completed for all pages, the image conversion APP 144 deletes the print image (PDF file) downloaded in step S1012 from the RAM 203.

Next, the image conversion APP 144 determines whether or not an error has been detected during processing in any one of steps S1011 to S1013 (step S1014). At this time, when the image conversion APP 144 determines that an error has been detected, the process shifts to step S1016, whereas when the image conversion APP 144 determines that no error has been detected, the image conversion APP 144 determines that processing is normally ended, and the process shifts to step S1015.

In step S1015, the image conversion APP 144 sets "0" representing "normal end" to the progress state (Progress) in the session management database, and ends download/image conversion thread processing (step S1017). In step S1016, the image conversion APP 144 sets "2" representing "error end" to the progress state (Progress) in the session management database, and ends download/image conversion thread processing (step S1017).

In step S1017, the image conversion APP 144 deletes information relating to the print job from the session management database to thereby update the session management database.

Figure 18A:
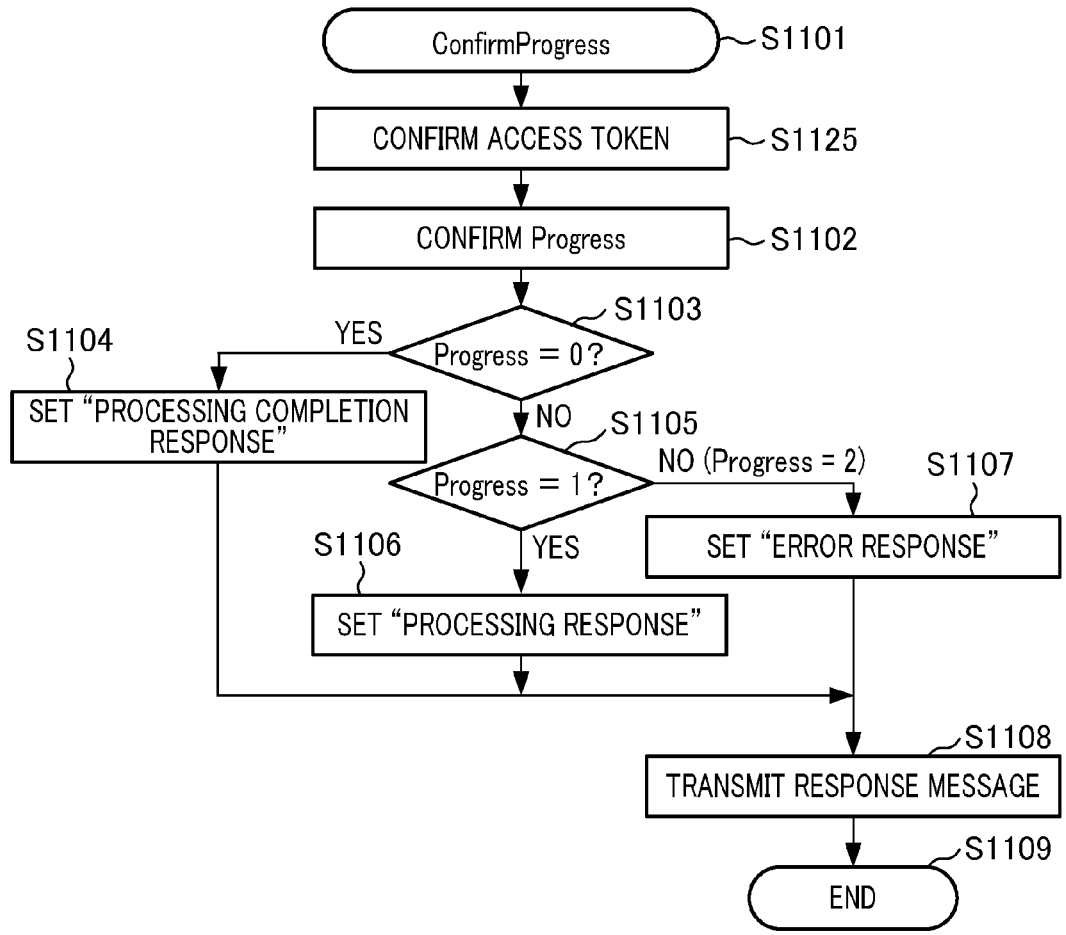
FIGS. 18A and 18B are diagrams illustrating an example of the flowchart of processing performed by an image conversion APP.

Next, a description will be given of processing for the Web service API to be exported by the image conversion APP 144 with reference to FIGS. 18A and 18B. FIG. 18A is a diagram illustrating an example of the flowchart of processing of the ConfirmProgress function. FIG. 18B is a diagram illustrating an example of the flowchart of processing of the JobCompleted function.

Here, the HTTP GET method is utilized for the ConfirmProgress function. The SSL-encrypted HTTPS POST method is utilized for the JobCompleted function. A program relating to these flowcharts is embedded in the PC 5, stored in the HDD 205, read into the RAM 203, and executed by the CPU 202.

When the proxy APP 143 calls the ConfirmProgress function in step S2614 shown in FIG. 13, the image conversion APP 144 executes processing of the ConfirmProgress function shown in FIG. 18A.

As shown in FIG. 18A, the image conversion APP 144 starts processing of the ConfirmProgress function (step S1101), and executes access token confirmation processing to be described below with reference to FIG. 22 (step S1125). At this time, the following information is passed as arguments of the processing (subroutine function):

Service ID
Printer ID issued by the cloud printing APP 146
Print job ID issued by the cloud printing APP 146
Access token for utilization of the image conversion APP 144

At this time, the HTTP GET request for the ConfirmProgress function includes a session ID and a sequence as query parameters. The sequence is any number created by the issuance source (in the present example, the proxy APP 143) of the GET request.

Next, the image conversion APP 144 confirms the progress state (Progress) in the session management database using the session ID included in query parameters as a search key (step S1102). Next, when the image conversion APP 144 determines that "0" representing "normal end" has been set to the progress state (Progress) (YES in step S1103), the process shifts to step S1104. On the other hand, when the image conversion APP 144 determines that "1" or "2" other than "0" has been set to the progress state (Progress) (NO in step S1103), the process shifts to step S1105.

In step S1104, the image conversion APP 144 sets the "processing completion response" to the response message to be included in the BODY of the response to the HTTP GET request, and the process shifts to step S1108. In step S1105, the image conversion APP 144 confirms the progress state (Progress). At this time, when the image conversion APP 144 determines that "1" representing "processing" is set to the progress state (Progress), the process shifts to step S1106, whereas when the image conversion APP 144 determines that "2" other than "1" is set to the progress state (Progress), the process shifts to step S1107.

In step S1106, the image conversion APP 144 sets the "processing response" to the response message to be included in the BODY of the response to the HTTP GET request, and the process shifts to step S1108. In step S1107, the image conversion APP 144 sets the "error response" to the response message to be included in the BODY of the response to the HTTP GET request, and the process shifts to step S1108.

In step S1108, the image conversion APP 144 transmits the response message to the issuance source (in the present example, the proxy APP 143) of the GET request, and ends processing of the ConfirmProgress function (step S1109).

Here, a detailed description will be given of "processing completion response", "processing response", and "error response". Each of these responses is the result of computation using the sequence included in the query parameters for the GET request in step S1101, and is constituted by, for example, character string information in which the following information is converted into a character string:

"Processing completion response"=sequence
"Processing response"=sequence+1
"Error response"=sequence+2

As described above, generally incomprehensible character string information instead of visible information defined by XML or the like is used for the response to the HTTP GET request. In this manner, a malfunction or a fraudulent control caused by an unauthorized access to the Web service API may be prevented. The configuration for preventing such an unauthorized access is not limited to this example. More complex computation such as hashing or the like may also be combined. When the proxy APP 143 calls the JobCompleted function in step S2803 shown in FIG. 15, the image conversion APP 144 executes processing of the JobCompleted function shown in FIG. 18B.

Figure 18B:
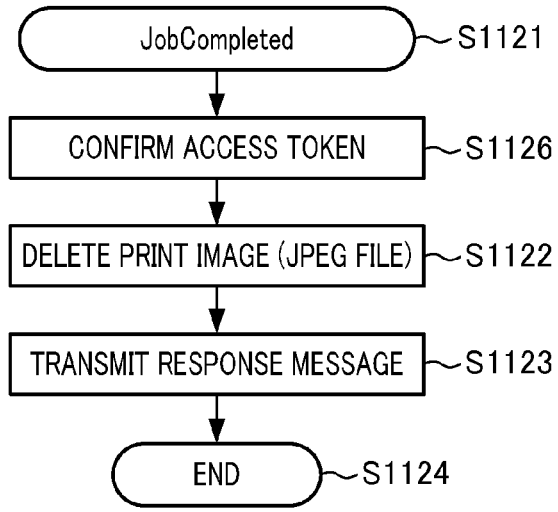

As shown in FIG. 18B, when the image conversion APP 144 starts processing of the JobCompleted function (step S1121), the image conversion APP 144 executes access token confirmation processing to be described below with reference to FIG. 22 (step S1126). At this time, the following information is passed as arguments of the processing (subroutine function):

Service ID
Printer ID issued by the cloud printing APP 146
Print job ID issued by the cloud printing APP 146
Access token for utilization of the image conversion APP 144

Then, the print image (JPEG file) is deleted (step S1122), and the process shifts to step S1123.

In step S1123, the image conversion APP 144 sets "SUCCESS" representing the fact that the function has been normally ended to the response message to be included in the BODY of the response to the HTTP POST request. In step S1123, the image conversion APP 144 transmits the response message to the issuance source (in the present example, the proxy APP 143) of the POST request. Then, the image conversion APP 144 ends processing of the JobCompleted function (step S1124).

Next, a description will be given of processing for the Web service API to be exported by the image conversion APP 144 with reference to FIG. 19. FIG. 19 is a diagram illustrating an example of the flowchart of processing of the CreatePrintJobResult function. The SSL-encrypted HTTPS POST method is utilized for the CreatePrintJobResult function. A program relating to these flowcharts is embedded in the PC 5, stored in the HDD 205, read into the RAM 203, and executed by the CPU 202.

Figure 19:
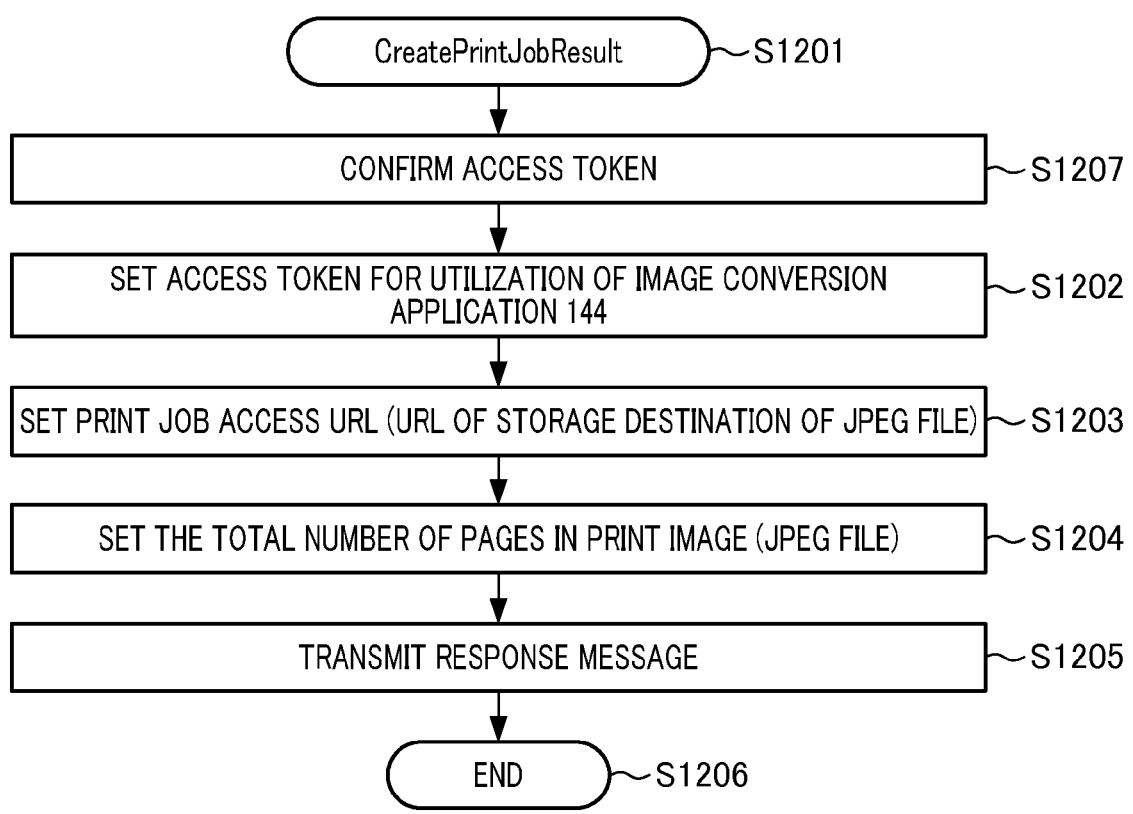
FIG. 19 is a diagram illustrating an example of the flowchart of processing performed by an image conversion APP.

When the proxy APP 143 calls the CreatePrintJobResult function in step S2701 shown in FIG. 14, the image conversion APP 144 executes processing of the CreatePrintJobResult function shown in FIG. 19.

As shown in FIG. 19, the image conversion APP 144 starts processing of the CreatePrintJobResult function (step S1201), and executes access token confirmation processing to be described below with reference to FIG. 22 (step S1207). At this time, the following information is passed as arguments of the processing (subroutine function):

Service ID
Printer ID issued by the cloud printing APP 146
Print job ID issued by the cloud printing APP 146
Access token for utilization of the image conversion APP 144

Next, the image conversion APP 144 sets an access token for utilization of the image conversion APP 144 to the response message to be included in the BODY of the response to the HTTP POST request (step S1202), and the process shifts to step S1203.

In step S1203, the image conversion APP 144 sets the print job access URL (URL of the storage destination of a JPEG file) to the response message to be included in the BODY of the response to the POST request, and the process shifts to step S1204. In step S1204, the image conversion APP 144 sets the total number of pages in the print image (JPEG file) to the response message to be included in the BODY of the response to the POST request, and the process shifts to step S1205. In step S1205, the image conversion APP 144 transmits the response message to the issuance source (in the present example, the proxy APP 143) of the POST request, and ends processing of the CreatePrintJobResult function (step S1206).

Figure 20A:
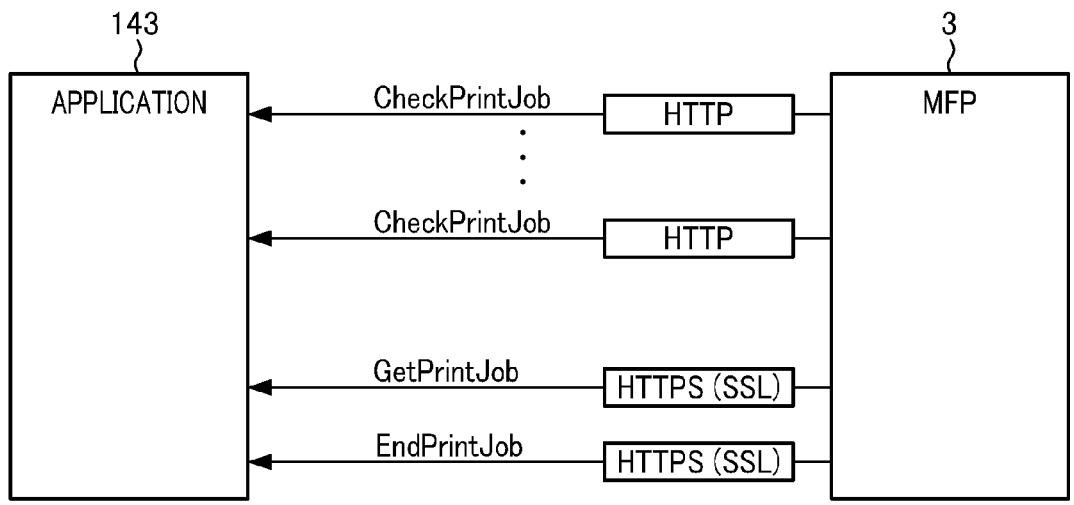
FIG. 20 is a diagram illustrating an example of a calling sequence.
Figure 20B:
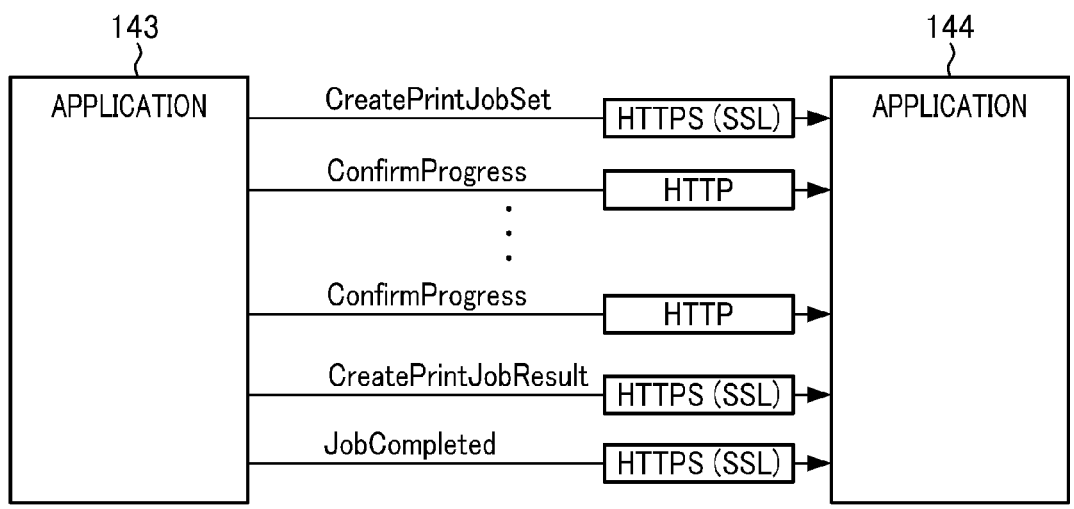

FIGS. 20A and 20B are diagrams illustrating an example of the calling sequence of the Web service API.

FIG. 20A is a diagram illustrating an example of a calling sequence between the proxy APP 143 and the MFP 3. FIG. 20B is a diagram illustrating an example of a calling sequence between the proxy APP 143 and the image conversion APP 144. As shown in FIG. 20A, between the proxy APP 143 and the MFP 3, the MFP 3 calls the Web service API being exported by the proxy APP 143. In other words, the Web service API being exported by the proxy APP 143 is called in the order of the CheckPrintJob function, the GetPrintJob function, and the EndPrintJob function. Here, the unencrypted HTTP GET method is utilized for the CheckPrintJob function (polling processing only) and the SSL-encrypted HTTPS GET method is utilized for the functions other than the CheckPrintJob function.

As described above, the unencrypted HTTP method is utilized for polling for confirming only the presence/absence of a print job, resulting in a reduction of the time required for polling. Consequently, an information processing system having excellent user operability can be realized. In addition, the load placing on polling can be reduced, and thus, the configuration for accommodating such load becomes unnecessary. Consequently, a system can be readily built and firmware for a printer and an MFP can be readily implemented, resulting in a reduction in development costs.

As shown in FIG. 20B, between the proxy APP 143 and the image conversion APP 144, the proxy APP 143 calls the Web service API being exported by the image conversion APP 144. In other words, the Web service API being exported by the proxy APP 143 is called in the order of the CreatePrintJobSet function, the ConfirmProgress function, the CreatePrintJobResult function, and the JobCompleted function. Here, the unencrypted HTTP GET method is utilized for the ConfirmProgress function (polling processing only) and the SSL-encrypted HTTPS POST method is utilized for the functions other than the ConfirmProgress function.

As described above, the unencrypted HTTP method is utilized for polling for confirming only the progress state of processing, resulting in a reduction of the time required for polling. Consequently, an information processing system having excellent user operability can be realized. In addition, the load placing on polling can be reduced, and thus, the configuration for accommodating such load becomes unnecessary. Consequently, a system can be readily built and application can be readily implemented, resulting in a reduction in development costs.

Next, a description will be given of processing for the Web service API to be exported by the image conversion APP 144 with reference to FIG. 21. FIG. 21 is a diagram illustrating an example of the flowchart of processing of the RegisterAndAuth function. The SSL-encrypted HTTPS POST method is utilized for the RegisterAndAuth function. A program relating to these flowcharts is embedded in the PC 5, stored in the HDD 205, read into the RAM 203, and executed by the CPU 202. In FIG. 21, processing relating to an error case is omitted and only a normal case is shown.

Figure 21:
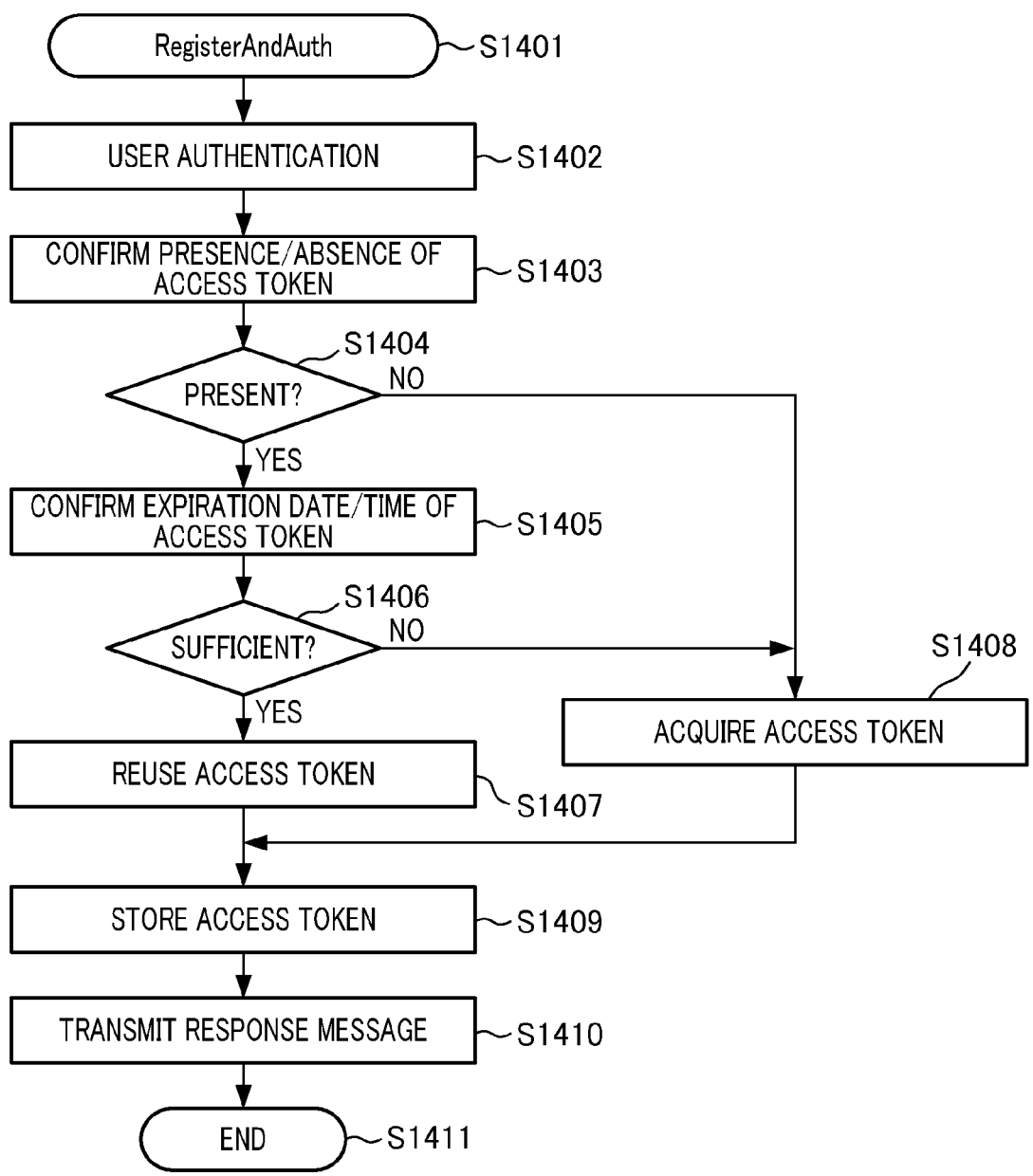
FIG. 21 is a diagram illustrating an example of the flowchart of processing performed by an image conversion APP.

When the proxy APP 143 calls the RegisterAndAuth function in step S2622 shown in FIG. 13, the image conversion APP 144 executes processing of the RegisterAndAuth function shown in FIG. 21.

As shown in FIG. 21, the image conversion APP 144 starts processing of the RegisterAndAuth function (step S1401). The image conversion APP 144 uses the "user ID utilizing the image conversion APP 144" and the "user password utilizing the image conversion APP 144" selected from among information passed from the proxy APP 143 as input parameters. Then, the image conversion APP 144 calls the user authentication function, which is one of the Web service API to be exported by the authentication APP 148, to thereby perform user authentication (step S1402). When the user authentication has failed in step S1402 due to the absence of a user, the image conversion APP 144 uses the "administrator ID utilizing the authentication APP 148" and the "administrator password utilizing the authentication APP 148". These information is included in information passed from the proxy APP 143 as input parameters. Then, the image conversion APP 144 calls the log-in function, which is one of the Web service API to be exported by the authentication APP 148, using these information and logs in. Then, the image conversion APP 144 calls the user registration function, which is one of the Web service API to be exported by the authentication APP 148, using these information passed from the proxy APP 143 as input parameters and register a new user to thereby perform user authentication.

When the user authentication has succeeded, the image conversion APP 144 refers to the "access token for utilization of the image conversion APP 144" among information passed from the proxy APP 143 as input parameters and confirms the presence/absence of a set value (step S1403). When there is a value (present), the process advances to step S1405, whereas when there is no value (absent), the process advances to step S1408 (step S1404). In step S1405, the image conversion APP 144 uses information passed from the APP 143 as input parameters. More specifically, the image conversion APP 144 uses the "user ID utilizing the image conversion APP 144", the "user password utilizing the image conversion APP 144", and the "access token for utilization of the image conversion APP 144". Then, the CPU 202 for the image conversion APP 144 calls the access token expiration date/time confirmation function which is one of the Web service API to be exported by the authentication APP 148. In this manner, the CPU 202 for the image conversion APP 144 confirms the expiration date/time of an access token for utilization of the image conversion APP 144 passed from the APP 143. In other words, the CPU 202 for the image conversion APP 144 functions as an expiration date/time determination unit that determines whether or not the remaining valid time period of an access token is sufficient, i.e., a predetermined time or more of the valid time period of an access token is still left.

When the image conversion APP 144 determines that the expiration date/time is sufficient, the process advances to step S1407, whereas when the image conversion APP 144 determines that the expiration date/time is insufficient, the process advances to step S1408 (step S1406). Processing for determining the expiration date/time by the image conversion APP 144 in step S1406 is the following processing. As described below in step S1408, the expiration date/time of an access token for utilization of the image conversion APP 144 is, for example, within 24 hours after an access token is issued. Thus, for example, when the remaining valid time of an access token can be acquired using the access token expiration date/time confirmation function and is 20 hours or more, the image conversion APP 144 determines that the expiration date/time is sufficient. When the remaining valid time is less than 20 hours, the image conversion APP 144 determines that the expiration date/time is insufficient. For example, when an issuance date and time of an access token can be acquired using the access token expiration date/time confirmation function, the image conversion APP 144 acquires the current date and time and calculates the time elapsed from the time at which an access token has been issued to the current time. In the present embodiment, the expiration date/time of an access token is 24 hours after an access token is issued. Thus, the image conversion APP 144 calculates the remaining valid time by subtracting the elapsed time from 24 hours. When the remaining valid time is 20 hours or more, the image conversion APP 144 determines that the expiration date/time is sufficient, whereas when the remaining valid time is less than 20 hours, the image conversion APP 144 determines that the expiration date/time is insufficient.

In step S1407, the image conversion APP 144 determines that a value set in the "access token for utilization of the image conversion APP 144" among information passed from the proxy APP 143 as input parameters is reused, and the process advances to step S1409. In step S1408, the image conversion APP 144 uses the "user ID utilizing the image conversion APP 144" and the "user password utilizing the image conversion APP 144" among information passed from the proxy APP 143 as input parameters. Then, the image conversion APP 144 calls the access token generation function which is one of the Web service API to be exported by the authentication APP 148 and acquires an access token for utilization of the image conversion APP 144. Then, the process advances to step S1409. The access token has an expiration date/time. Here, as an example, the expiration date/time is defined within 24 hours after an access token is issued.

In step S1409, the image conversion APP 144 stores the access token for utilization of the image conversion APP 144 in the session management database. The session management database stores the following information:
[Session Management Database]
Search key: value generated by the combination of the service ID, the printer ID issued by the cloud printing APP 146, and the print job ID issued by the cloud printing APP 146
Access token for utilization of the image conversion APP 144

The image conversion APP 144 sets "SUCCESS" representing the fact that the function has been successful and thus has been normally ended to the response message to be included in the BODY of the response to the HTTP POST request. At this time, the image conversion APP 144 also sets the access token for utilization of the image conversion APP 144, which has acquired in step S1403 (step S1410). Then, the image conversion APP 144 transmits the response message to the issuance source (in the present example, the proxy APP 143) of the POST request (step S1410). Then, the image conversion APP 144 ends processing of the RegisterAndAuth function (step S1411).

Figure 22:
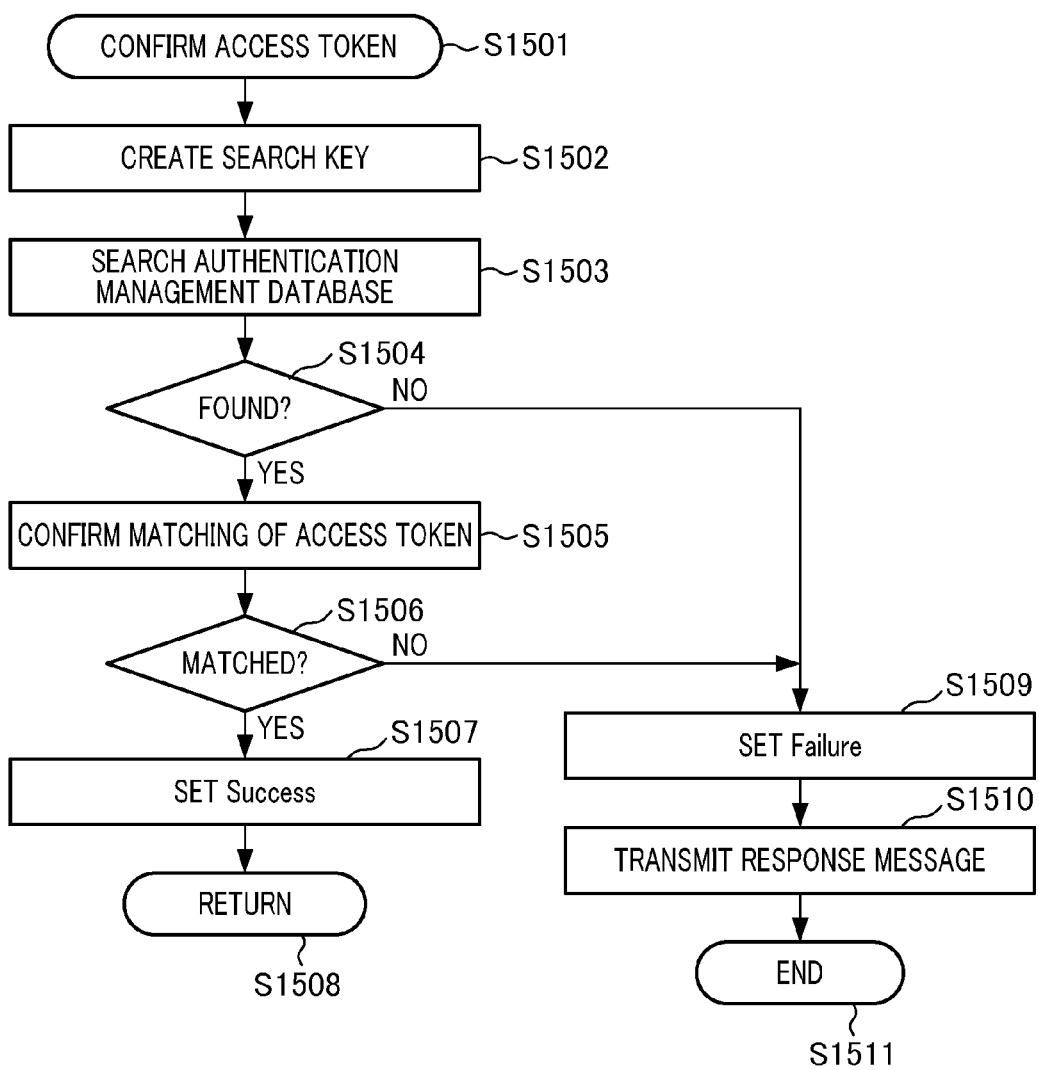
FIG. 22 is a diagram illustrating an example of the flowchart of processing performed by an image conversion APP.

FIG. 22 is a flowchart illustrating an example of the flowchart of processing performed by the image conversion APP 144 and is a flowchart illustrating access token confirmation processing. A program relating to these flowcharts is embedded in the PC 5, stored in the HDD 205, read into the RAM 203, and executed by the CPU 202. Access token confirmation processing is the subroutine function in the image conversion APP 144, and the following information is passed as arguments of the subroutine function:
Service ID
Printer ID issued by the cloud printing APP 146
Print job ID issued by the cloud printing APP 146
Access token for utilization of the image conversion APP 144

In step S1018 shown in FIG. 17A, step S1125 shown in FIG. 18A, step S1126 shown in FIG. 18B, and step S1207 shown in FIG. 19, the image conversion APP 144 executes access token confirmation processing. As shown in FIG. 22, next, the image conversion APP 144 starts access token confirmation processing (step S1501). The image conversion APP 144 creates a search key using the combination of the service ID, the printer ID issued by the cloud printing APP 146, and the print job ID issued by the cloud printing APP 146 (step S1502). Then, the image conversion APP 144 searches the session management database using the search key (step S1503). When the image conversion APP 144 finds information associated with the search key in the session management database, the process advances to step S1505, whereas when the image conversion APP 144 does not find information, the process advances to step S1509 (step S1504).

In step S1505, the image conversion APP 144 performs comparison processing. More specifically, the image conversion APP 144 compares whether or not the access token for utilization of the image conversion APP 144, which has been passed as an argument of the subroutine function, matches the access token for utilization of the image conversion APP 144, which is stored in the session management database. When the image conversion APP 144 determines that both access tokens are matched, the process advances to step S1507, whereas when the image conversion APP 144 determines that both access tokens are not matched, the process advances to step S1509 (step S1506).

In step S1507, the image conversion APP 144 sets "SUCCESS" representing success to a return value, and returns to the caller of the subroutine function (step S1508). In step S1509, the image conversion APP 144 sets "FAILURE" representing failure to a return value. Then, the image conversion APP 144 sets "FAILURE" representing the fact that the API has been ended in failure to the response message included in the BODY of the response (step S1510). The image conversion APP 144 transmits the response message to the caller of the subroutine function, i.e., the HTTP POST request for the Web service API to be exported by the image conversion APP 144. Then, the image conversion APP 144 transmits the response message to the issuance source (in the present example, the proxy APP 143) of the POST request (step S1510). Then, the image conversion APP 144 ends processing of the subroutine function and the API (step S1511).

In step S1505, the image conversion APP 144 performs comparison processing. More specifically, the image conversion APP 144 compares whether or not the access token for utilization of the image conversion APP 144, which has been passed as an argument of the subroutine function, matches the access token for utilization of the image conversion APP 144, which is stored in the session management database. Based on the result of comparison whether or not both access tokens are matched, the image conversion APP 144 determines the validity of the access token without utilizing the access token validity confirmation function to be exported by the authentication APP 148. Thus, the image conversion APP 144 does not need to call for the access token validity confirmation function of the Web service API to be exported by the authentication APP 148 each time the proxy APP 143 calls the image conversion APP 144, resulting in an improvement in performance.

According to the third embodiment, there is no need to reissue (reacquire) an authentication (access) token each time a print job is issued. Thus, a large amount of time is not required for access token acquisition processing or an increase in use resources associated with access token acquisition can be prevented.

The scale of the system for the authentication APP 148 can be reduced, resulting in increased simplicity of the system structure. Thus, operational costs can also be reduced. In addition, the present embodiment is effective for a malicious attack by means of a spoofing program spoofing the proxy APP 143 serving as an upstream service. Even when a malicious access is made from a spoofing attack program, a malfunction and information leakage caused thereby can also be prevented. Furthermore, when the proxy APP 143 serving as an upstream service fails in operation, an access token attached to a print job may be associated with another print job caused by the malfunction. Even in such a case, the image conversion APP 144 can stop printing without processing the print job, and thus, error printing can also be prevented.

According to the aforementioned embodiments, a description has been given based on the assumption that the information processing apparatus is a personal computer. However, the present invention is not limited thereto but is applicable to any information processing apparatus (terminal), which can be used in a similar manner as above, such as DVD players, games, set topboxes, Internet appliances, and the like. In the aforementioned embodiments, an MFP has been exemplified as a peripheral device. However, a peripheral device may be any one of devices including a copier function, a facsimile function, a scanner function, a digital camera function, and a complex function thereof.

In the aforementioned embodiments, the OS equivalent to Windows (registered trademark) is used. The present invention is not limited thereto but any type of OS can be used. In the aforementioned embodiments, Ethernet (registered trademark) is used as an exemplary configuration of the network 4. The present invention is not limited thereto but any other network configuration may also be used.

In the aforementioned embodiments, Ethernet (registered trademark) is used as an interface among the PCs 1, 2, 5, and 7 and the MFPs 3 and 133. However, the present invention is not limited thereto but any interface such as wireless LAN, IEEE 1394, Bluetooth (registered trademark), USB, and the like may also be used. The functions of various applications (firmware) or a part or all of processing of the flowchart may also be performed by dedicated hardware.

Even when a cloud system is utilized for the information processing system, a system can be readily built and application can be readily implemented, resulting in a reduction in development and operational costs.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-143979 filed on Jun. 29, 2011 and Japanese Patent Application No. 2011-282782 filed on Dec. 26, 2011, which are hereby incorporated by reference herein in their entirety.

What is claimed is:

1. A print control device for managing a print job based on an instruction from a client terminal, the print control device comprising:
   an acceptance unit configured to accept a print instruction to a printer from the client terminal and authentication information comprising user information;
   a confirmation unit configured to confirm the validity of the authentication information to an authentication unit configured to issue and manage the authentication information;
   a registration unit configured to register the print job as an execution job together with the authentication information if the authentication information is confirmed to be valid;
   an update unit configured to access the authentication unit during registration of the execution job and update the expiration date/time of the registered authentication information; and
   a reception unit configured to receive regular communication from the printer at regular intervals,
   wherein, when the regular communication has not been received even after the elapse of a predetermined period of time from the reception of the regular communication by the reception unit, the registration unit deletes the registered execution job.

2. The print control device according to claim 1, wherein the update unit updates the expiration date/time at regular intervals.

3. The print control device according to claim 1, wherein the update unit inquires of the authentication unit as to the validity of an authentication token and updates a last accessed date/time to thereby update the expiration date/time of the authentication information.

4. The print control device according to claim 1, wherein, when a plurality of execution jobs are registered, the update unit updates the expiration date/time of the authentication information for all of the plurality of execution jobs.

5. A printing control method for managing a print job based on an instruction from a client terminal, the method comprising:
   accepting, in an acceptance step, a print instruction to a printer from the client terminal and authentication information comprising user information;
   confirming, in a confirmation step, the validity of the authentication information to an authentication unit configured to issue and manage the authentication information;
   registering, in a registration step, the print job as an execution job together with the authentication information if the authentication information is confirmed to be valid;
   updating, in an update step, the expiration date/time of the registered authentication information through access to the authentication unit during registration of the execution job; and receiving, in a reception step, regular communication from the printer at regular intervals, wherein, when the regular communication has not been received even after the elapse of a predetermined period of time from the reception of the regular communication in the reception step, the registered execution job is deleted.

6. The printing control method according to claim 5, wherein the expiration date/time is updated at regular intervals in the update step.

7. The printing control method according to claim 5, wherein the expiration date/time of the authentication information is updated in the update step by inquiring of the authentication unit as to the validity of an authentication token and updating a last accessed date/time.

8. The printing control method according to claim 5, wherein, when a plurality of execution jobs are registered, the update unit updates the expiration date/time of the authentication information for all of the plurality of execution jobs in the update step.

9. A non-transitory computer-readable storage medium on which is stored a computer program for making a computer execute a method for managing a print job based on an instruction from a client terminal, the program comprising code for:

accepting, in an acceptance step, a print instruction to a printer from the client terminal and authentication information comprising user information;

confirming, in a confirmation step, the validity of the authentication information to an authentication unit configured to issue and manage the authentication information;

registering, in a registration step, the print job as an execution job together with the authentication information if the authentication information is confirmed to be valid;

updating, in an update step, the expiration date/time of the registered authentication information through access to the authentication unit during registration of the execution job; and receiving, in a reception step, regular communication from the printer at regular intervals, wherein, when the regular communication has not been received even after the elapse or a predetermined period of time from the reception of the regular communication in the reception step, the registered execution job is deleted.

10. A print control device for managing a print job based on an instruction from a client terminal, the print control device comprising:

an acceptance unit configured to accept a print instruction to a printer from the client terminal and authentication information comprising user information;

a confirmation unit configured to confirm the validity of the authentication information to an authentication unit configured to issue and manage the authentication information;

a registration unit configured to register the print job as an execution job together with the authentication information if the authentication information is confirmed to be valid; and a request unit configured to request the authentication unit to issue second authentication information during registration of the execution job by the registration unit, wherein the registration unit registers the second authentication information issued from the authentication unit together with the execution job.

11. An information processing system comprising:

a relay service device that performs relay processing related to a service provided from a provision device to a user via a network;

an intermediate service device that communicates with the relay service device and performs relation processing related to the service; and an authentication service device that accepts an authentication request from the intermediate service device and performs authentication processing, wherein the intermediate service device comprises:

an acquisition unit configured to transmit an authentication request to the authentication service device when the acquisition unit accepts the authentication request from the relay service device and an access token is not included in the authentication request, and acquire an access token from the authentication service device of which authentication has succeeded; and an expiration date/time determination unit configured to determine whether or not a valid time period of an access token included in the authentication request remains for a predetermined time or more upon acceptance of the authentication request, wherein, when the expiration date/time determination unit has determined that the valid time period of the access token remains for the predetermined time or more, the relay service device reuses the access token as the access token for use when making an authentication request, whereas when the expiration date/time determination unit has determined that the remaining valid time is insufficient, the acquisition unit acquires an access token from the authentication service device.

12. An information processing apparatus comprising:

a relay service device that performs relay processing related to a service provided from a provision device to a user via a network; and an authentication service device that performs authentication processing, wherein the information processing apparatus comprises:

an acquisition unit configured to transmit an authentication request to the authentication service device when the acquisition unit accepts the authentication request from the relay service device and an access token is not included in the authentication request, and acquire an access token from the authentication service device of which authentication has succeeded; and an expiration date/time determination unit configured to determine whether or not a valid time period of an access token included in the authentication request remains for a predetermined time or more upon acceptance of the authentication request, wherein, when the expiration date/time determination unit has determined that the valid time period of the access token remains for the predetermined time or more, the relay service device reuses the access token as the access token for use when making an authentication request, whereas when the expiration date/time determination unit has determined that the remaining valid time period is insufficient, the acquisition unit acquires an access token from the authentication service device.

13. A method for controlling an information processing system comprising:

a relay service device that performs relay processing related to a service provided from a provision device to a user via a network;

an intermediate service device that communicates with the relay service device and performs relation processing related to the service; and an authentication service device that accepts an authentication request from the intermediate service device and performs authentication processing, wherein the method comprises:

transmitting, in an access token acquisition step performed by an acquisition unit in the intermediate service device, an authentication request to the authentication service device when the acquisition unit accepts the authentication request from the relay service device and an access token is not included in the authentication request, and acquiring an access token from the authentication service device of which authentication has succeeded; and determining, in an expiration date/time determination step performed by an expiration date/time determination unit in the intermediate service device, whether or not a valid time period of an access token included in the authentication request remains for a predetermined time or more upon acceptance of the authentication request, wherein, when it has been determined in the expiration date/time determination step that the valid time period of the access token remains for the predetermined time or more, the relay service device reuses the access token as the access token for use when making an authentication request, whereas when it has been determined in the expiration date/time determination step that the remaining valid time period is insufficient, the acquisition unit acquires an access token from the authentication service device.

14. A non-transitory computer readable storage medium on which is stored a computer program for making a computer execute a method for controlling an information processing system comprising:

a relay service device that performs relay processing related to a service provided from a provision device to a user via a network;

an intermediate service device that communicates with the relay service device and performs relation processing related to the service; and an authentication service device that accepts an authentication request from the intermediate service device and performs authentication processing, wherein the program comprises code for:

transmitting, in an access token acquisition step performed by an acquisition unit in the intermediate service device, an authentication request to the authentication service device when the acquisition unit accepts the authentication request from the relay service device and an access token is not included in the authentication request and acquiring an access token from the authentication service device of which authentication has succeeded; and determining, in an expiration date/time determination step performed by an expiration date/time determination unit in the intermediate service device, whether or not a valid time period of an access token included in the authentication request remains for a predetermined time or more upon acceptance of the authentication request, wherein, when it has been determined in the expiration date/time determination step that the valid time period of the access token remains for the predetermined time or more, the relay service device reuses the access token as the access token for use when making an authentication request, whereas when it has been determined in the expiration date/time determination step that the remaining valid time period is insufficient, the acquisition unit acquires an access token from the authentication service device.

15. An information processing system comprising:

a print control device for managing a print job based on an instruction from a client terminal; and a printer for executing a received print job, wherein the print control device comprises:

an acceptance unit configured to accept a print instruction to the printer from the client terminal and authentication information comprising user information;

a confirmation unit configured to confirm the validity of the authentication information to an authentication unit configured to issue and manage the authentication information;

a registration unit configured to register the print job as an execution job together with the authentication information if the authentication information is confirmed to be valid;

an update unit configured to access the authentication unit during registration of the execution job and update the expiration date/time of the registered authentication information; and a reception unit configured to receive regular communication from the printer at regular intervals, wherein, when the regular communication has not been received even after the elapse of a predetermined period of time from the reception of the regular communication by the reception unit, the registration unit deletes the registered execution job.

16. An information processing system comprising:

a relay service device that performs relay processing related to a service provided from a provision device to a user via a network;

an intermediate service device that communicates with the relay service device and performs relation processing related to the service;

an authentication service device that accepts an authentication request from the intermediate service device and performs authentication processing; and a client device that transmits a print instruction, wherein the intermediate service device comprises:

an acquisition unit configured to transmit an authentication request to the authentication service device when the acquisition unit accepts the authentication request from the relay service device according to the print instruction from the client device and an access token is not included in the authentication request, and acquire an access token from the authentication service device of which authentication has succeeded; and an expiration date/time determination unit configured to determine whether or not a valid time period of an access token included in the authentication request remains for a predetermined time or more upon acceptance of the authentication request, wherein, when the expiration date/time determination unit has determined that the valid time period of the access token remains for the predetermined time or more, the relay service device reuses the access token as the access token for use when making an authentication request, whereas when the expiration date/time determination unit has determined that the remaining valid time is insufficient, the acquisition unit acquires an access token from the authentication service device.

* * * * *